(12) United States Patent
Sagawa

(10) Patent No.: US 8,005,298 B2
(45) Date of Patent: Aug. 23, 2011

(54) IMAGE PROCESSING APPARATUS AND METHOD THEREOF

(75) Inventor: Naotsugu Sagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 924 days.

(21) Appl. No.: 11/953,778

(22) Filed: Dec. 10, 2007

(65) Prior Publication Data

US 2008/0253651 A1    Oct. 16, 2008

(30) Foreign Application Priority Data

Dec. 22, 2006   (JP) ................................. 2006-346651

(51) Int. Cl.
*G06K 9/00* (2006.01)

(52) U.S. Cl. ........ 382/167; 382/162; 382/164; 382/165; 382/166; 382/274

(58) Field of Classification Search .................. 382/162, 382/164, 165, 166, 167, 274, 275; 345/589, 345/597, 617; 348/453, 496, 223.1

See application file for complete search history.

(56) References Cited

U.S. PATENT DOCUMENTS

| | | | |
|---|---|---|---|
| 5,802,361 A * | 9/1998 | Wang et al. | 382/217 |
| 6,975,759 B2 | 12/2005 | Lin | |
| 7,298,380 B2 | 11/2007 | Yoshida | |
| 7,460,707 B2 * | 12/2008 | Nishi | 382/167 |
| 2004/0119851 A1 * | 6/2004 | Kaku | 348/239 |
| 2005/0238230 A1 * | 10/2005 | Yoshida | 382/167 |
| 2008/0220750 A1 * | 9/2008 | Steinberg et al. | 455/414.1 |

FOREIGN PATENT DOCUMENTS

| | | |
|---|---|---|
| CN | 1663287 | 8/2005 |
| CN | 1691063 | 11/2005 |
| JP | 7-141506 | 6/1995 |
| JP | 11-250227 | 9/1999 |
| JP | 2002-247596 | 8/2002 |
| JP | 2004-173328 | 6/2004 |
| JP | 2006-011685 | 1/2006 |
| JP | 2006-059162 | 3/2006 |

OTHER PUBLICATIONS

Chinese Office Action dated Aug. 14, 2009 in CN 200710160705.

* cited by examiner

*Primary Examiner* — Samir A Ahmed
*Assistant Examiner* — Ali Bayat
(74) *Attorney, Agent, or Firm* — Fitzpatrick, Cella, Harper & Scinto

(57) ABSTRACT

The color of a tooth image region is corrected so as not to form an unnatural face image. To this end, a first image region corresponding to teeth is detected from the image. A second image region corresponding to a face portion other than the teeth is detected from the image. Then, the color of the first image region is corrected based on the feature amounts of the colors of the first and second image regions.

6 Claims, 29 Drawing Sheets

F I G. 4
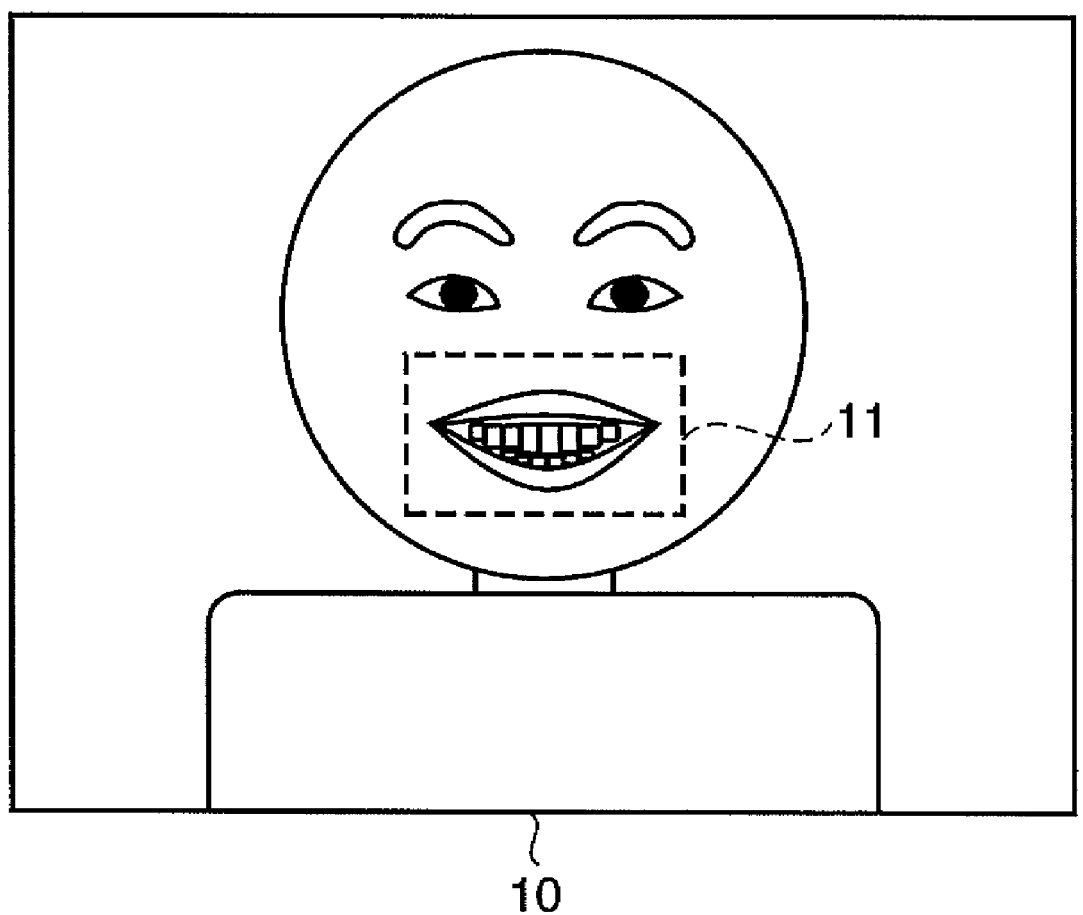

F I G. 5
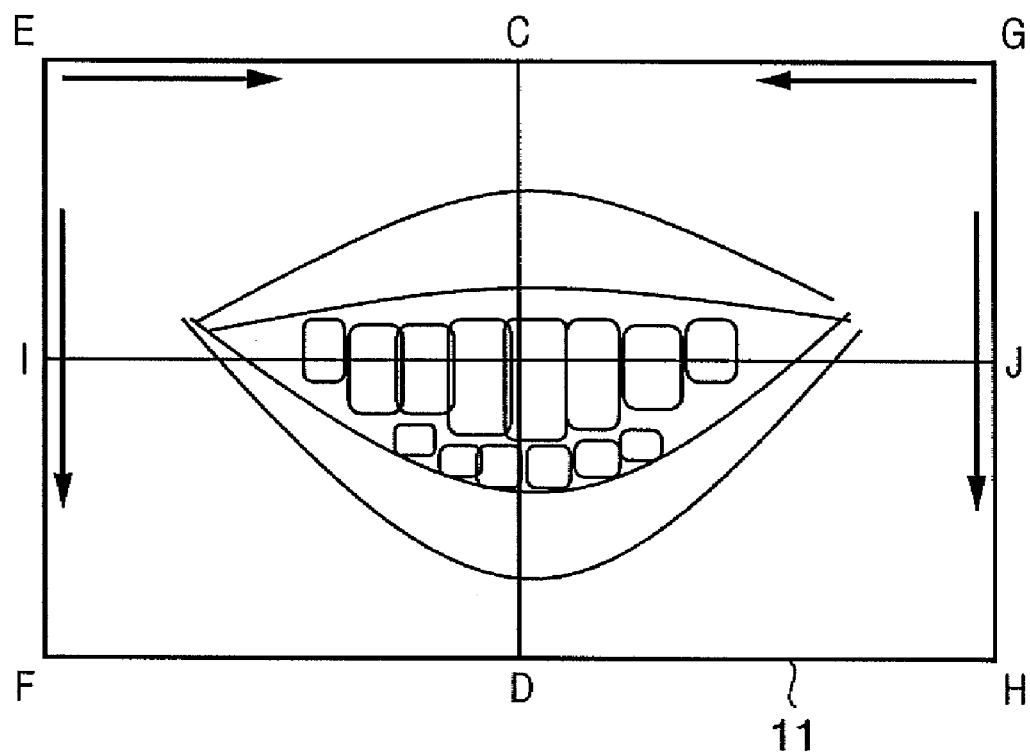

F I G. 13
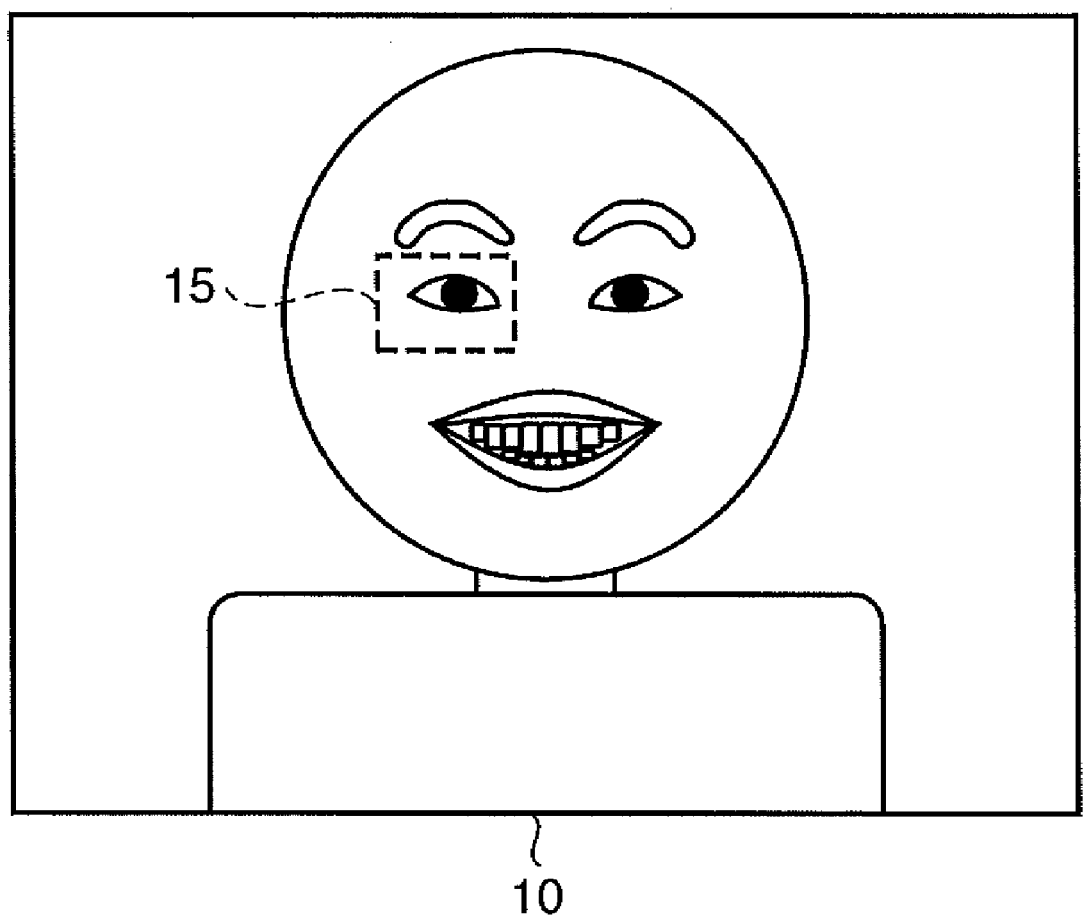

F I G. 14
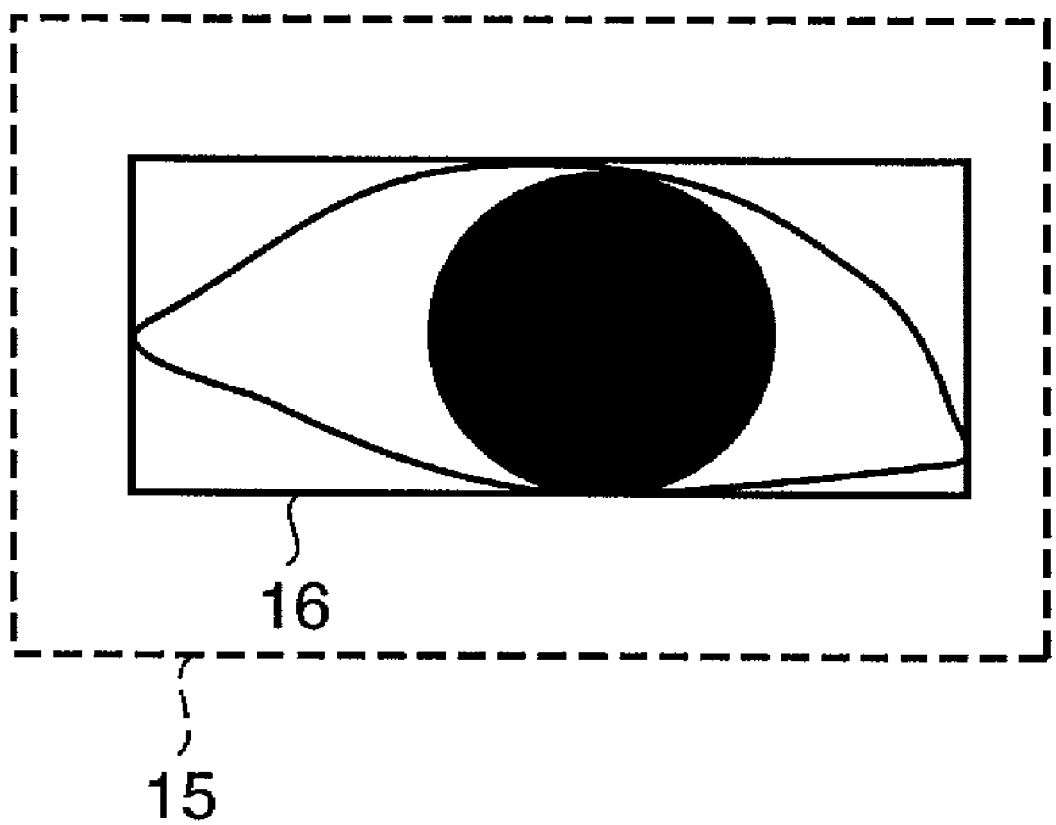

F I G. 15
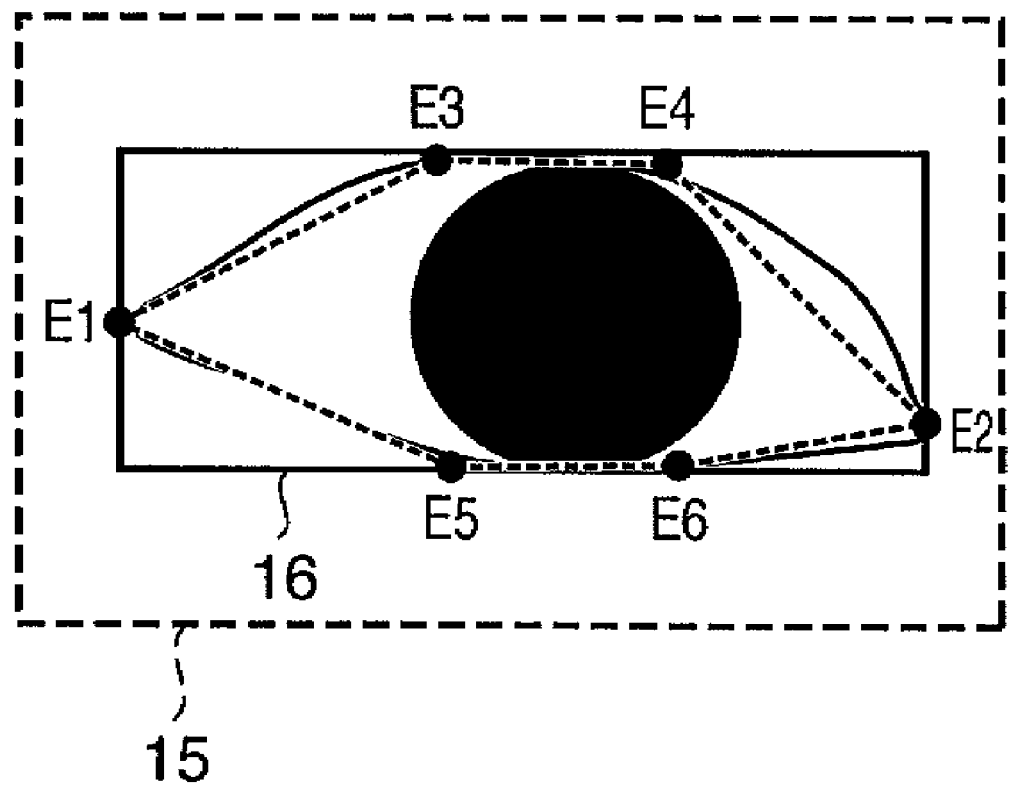

F I G. 19
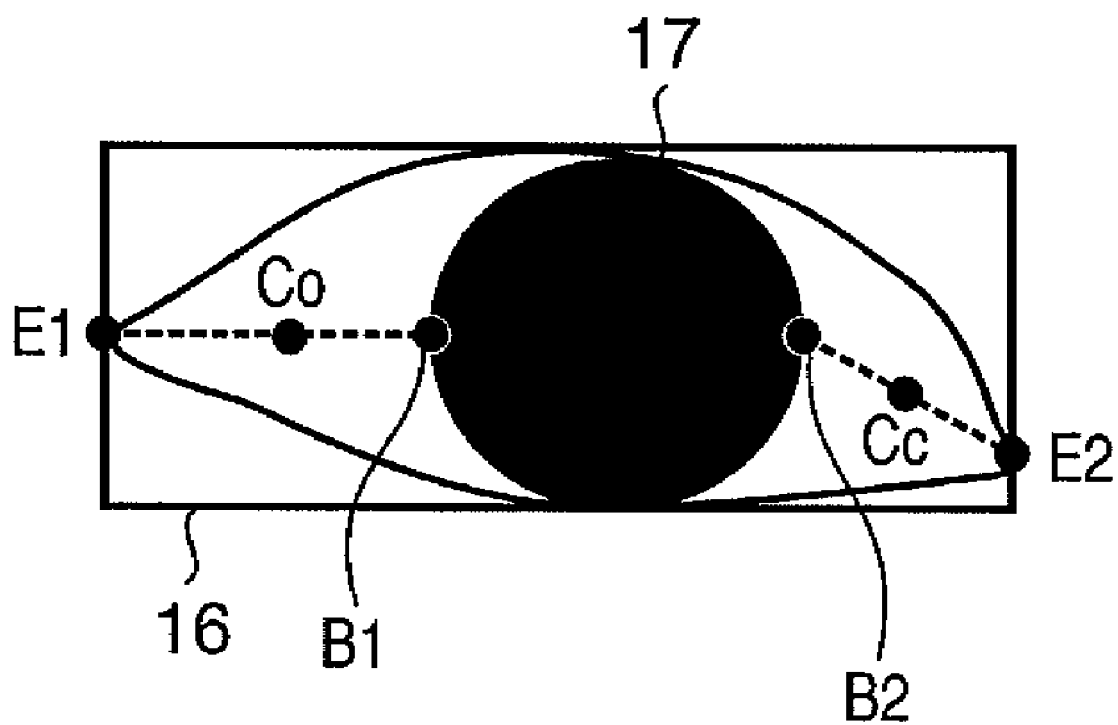

F I G. 20
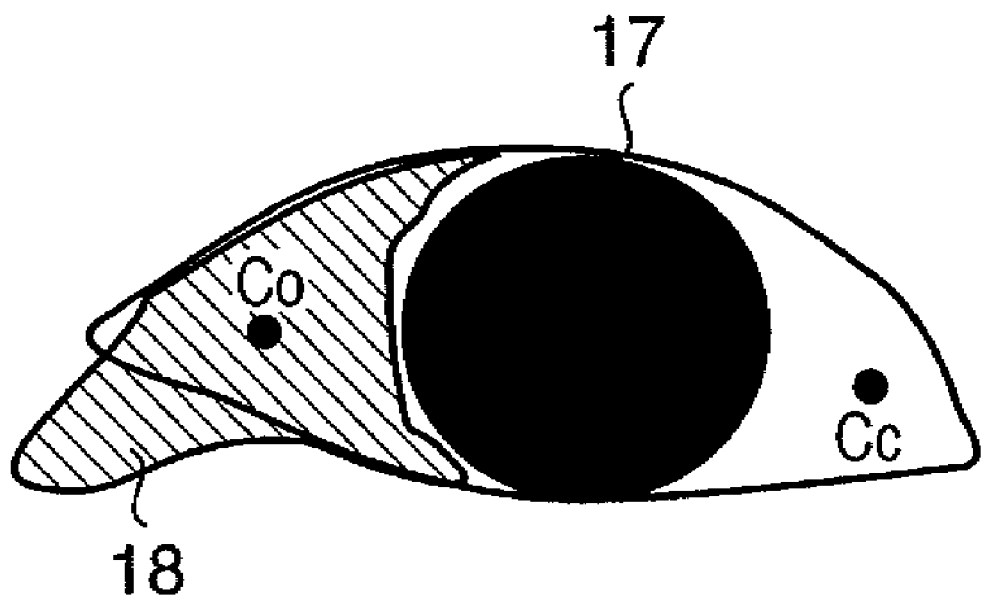

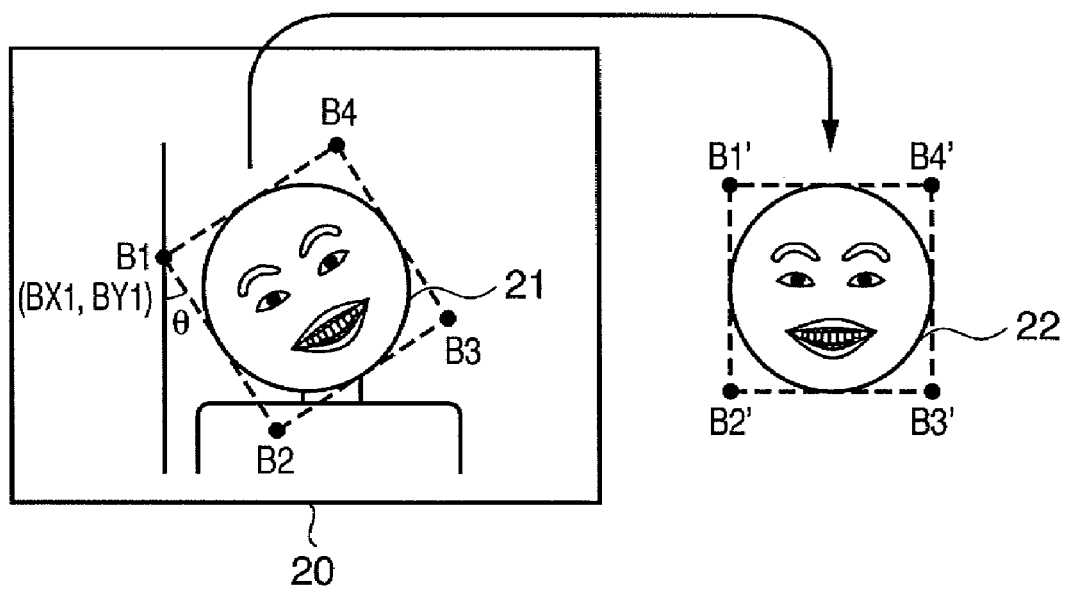
F I G. 27

IMAGE PROCESSING APPARATUS AND METHOD THEREOF

BACKGROUND OF THE INVENTION

1. Field of the Invention

The present invention relates to image processing for a face image region.

2. Description of the Related Art

A technique for improving the image quality of a portrait is drawing increased attention. For example, a red eye correction technique disclosed in Japanese Patent Laid-Open No. 2002-247596, a technique which corrects a portrait to make skin look smooth is disclosed in Japanese Patent Laid-Open No. 11-250227, and the like are available.

In order to improve the impression of a portrait, the improvements of image qualities of not only eyes and skin but also the mouth have large influences. For example, correcting yellowed or stained teeth to be white makes these teeth look fresh and healthy, thus improving the impression of the entire portrait. Japanese Patent Laid-Open No. 2006-059162 discloses an invention which detects a tooth image region (to be referred to as a tooth image hereinafter) from a face image region (to be referred to as a face image hereinafter), and corrects the detected tooth image to be white according to a predetermined target value.

However, human perception is sensitive to the image quality of a face image. A balance is required between the colors of a given organ and another organ, and if the color of the given organ is largely different from that of another organ, one feels unnatural. For example, when a tooth image undergoes white correction, if the chroma level of the tooth image is too low with respect to that around the tooth image, only teeth in a face image stand out, resulting in an unnatural face image.

In particular, a face image generally having a high chroma level has a high chroma level of the color around teeth. If such tooth image undergoes white correction in the same manner as a face image generally having a low chroma level, a face image with teeth which stand out very much is formed. In other words, a target value required to correct the tooth image must be determined in consideration of the chroma level of the entire face image.

SUMMARY OF THE INVENTION

In one aspect, an image processing apparatus comprises a first detector, arranged to detect a first image region corresponding to teeth from an image, a second detector, arranged to detect a second image region corresponding to a face portion other than the teeth from the image, and a corrector, arranged to correct a color of the first image region based on a feature amount of the color of the first image region and a feature amount of a color of the second image region.

In another aspect, an image processing method comprises the steps of detecting a first image region corresponding to teeth from an image, detecting a second image region corresponding to a face portion other than the teeth from the image, and correcting a color of the first image region based on a feature amount of the color of the first image region and a feature amount of a color of the second image region.

According to these aspects, the color of an image region of teeth can be corrected without forming an unnatural face image.

Further features of the present invention will become apparent from the following description of exemplary embodiments with reference to the attached drawings.

BRIEF DESCRIPTION OF THE DRAWINGS

FIG. 4 shows an example of a face image;

FIG. 5 is a view for explaining line segments which contact the edges of a mouth image;

FIG. 13 shows a candidate rectangle for eye;

FIG. 14 shows the relationship between the candidate rectangle and circumscribed rectangle of eye;

FIG. 15 is a view for explaining detection of an eye image;

FIG. 19 is a view for explaining determination of a seed;

FIG. 20 is a view for explaining the detection method of a white eye image;

FIG. 27 shows a face image which has a tilt with respect to the entire image;

DESCRIPTION OF THE EMBODIMENTS

Image processing according to embodiments of the present invention will be described in detail hereinafter with reference to the accompanying drawings.

First Embodiment

[Overview]

The first embodiment will describe a method of determining a target value of correction by analyzing the chroma level of an image region of a white eye (to be referred to as a white eye image hereinafter) upon applying white correction to a tooth image.

As described above, upon correcting the color of a tooth image, only teeth stand out in a face image unless the balance with the color of the entire face image is kept, resulting in an unnatural face image. Hence, in the first embodiment, the chroma level of a face portion (e.g., a white eye image) closest to an achromatic color other than teeth in the face image is analyzed to determine a target value of correction which gives, to the tooth image, a chroma level relative to that of the face portion other than the teeth.

[Arrangement of Apparatus]

Figure 1:
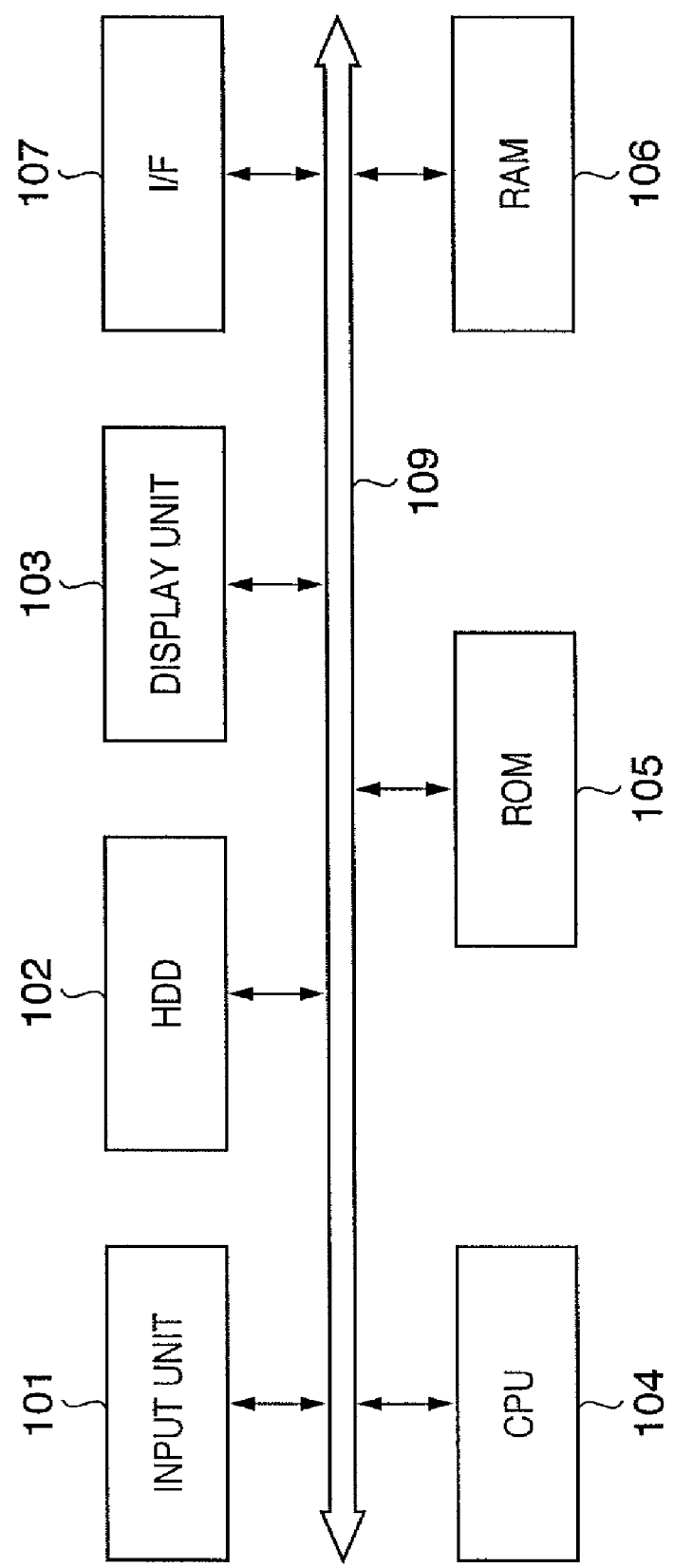
FIG. 1 is a block diagram showing the arrangement of an image processing apparatus.

FIG. 1 is a block diagram showing the arrangement of an image processing apparatus according to the first embodiment.

A microprocessor (CPU) 104 executes various processes including processes to be described later by executing programs stored in a read only memory (ROM) 105 and hard disk drive (HDD) 102 using a random access memory (RAM) 106 as a work memory to control respective components to be described later via a system bus 109.

An input unit 101 comprises a keyboard, pointing device, and the like. The user inputs data to the image processing apparatus via the input unit 101, and instructs the CPU 104 to execute various operations. The HDD 102 stores various binary data and meta data. Also, the HDD 102 stores control programs and processing programs required for the CPU 104 to implement the processes to be described later.

A display unit 103 comprises a cathode ray tube (CRT), liquid crystal panel display (LCD), or the like. The CPU 104 displays, on the display unit 103, user interfaces, the progresses and results of processes, and the like. An interface (I/F) 107 comprises, for example, serial bus interfaces such as USB (Universal Serial Bus), IEEE 1394, and the like. The CPU 104 can load image data from a digital camera or memory card reader connected to the I/F 107, and can store them in the HDD 102. The CPU 104 can output image data and the like stored in the HDD 102 to an external apparatus via the I/F 107.

[Image Processing]

Figure 2:
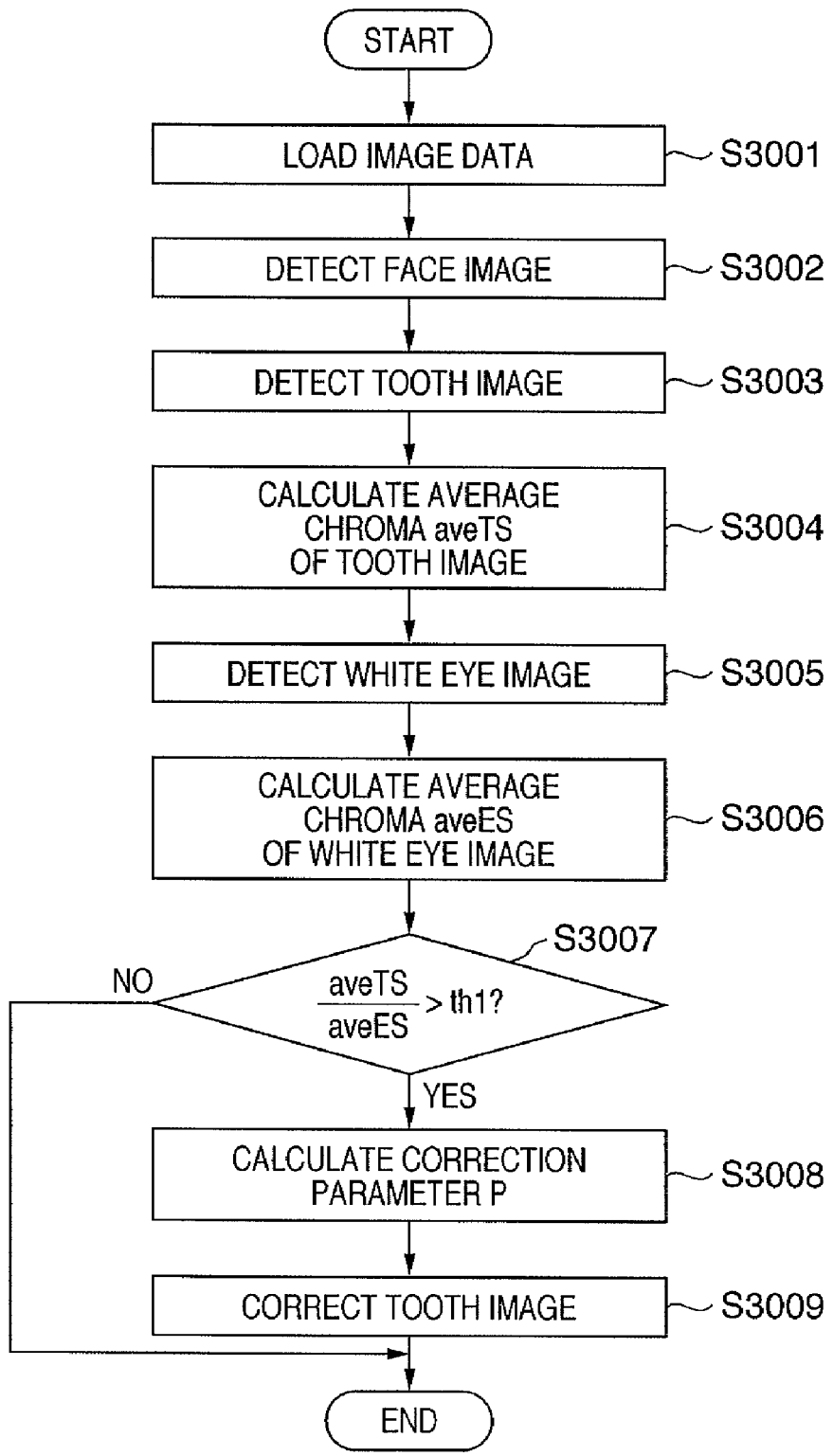
FIG. 2 is a flowchart for explaining image processing.

FIG. 2 is a flowchart for explaining the image processing, which is executed by the CPU 104.

The CPU 104 loads image data to be corrected onto a predetermined area of the RAM 106 (S3001), and detects a face image from the loaded image data (S3002). A face image can be detected using a method described in, for example, Hitoshi Hongo and Kazuhiko Yamamoto, "Face and Feature Detection Using Skin Color and Motion", The journal of the Institute of Image Information and Television Engineers, the Institute of Image Information and Television Engineers, Vol. 52, No. 12, pp. 86-93, December, 1998. Alternatively, a method of using a skin color disclosed in Japanese Patent Laid-Open No. 7-141506, a method using pattern matching, and the like may be used.

The CPU 104 detects a tooth image from the detected face image (S3003), and calculates an average chroma aveTS of the detected tooth image (S3004). The CPU 104 detects a white eye image from the detected face image (S3005), and calculates an average chroma aveES of the detected white eye image (S3006). The detection method of a tooth image, the calculation method of the average chroma of the tooth image, the detection method of a white eye image, and the calculation method of the average chroma aveES of the white eye image will be described later.

The CPU 104 then checks if the tooth image has a color that requires correction processing (S3007). This checking step is made to skip the correction processing of the tooth image if the tooth image is originally white and need not be corrected to be white. In a standard face image, if the chroma of a tooth image is higher than that of a white eye image to some extent, one feels that the tooth image has a color. Hence, as a checking method, the CPU 104 checks if the average chroma aveTS of the tooth image and the average chroma aveTS of the white eye image satisfy:

$$\text{ave}TS/\text{ave}ES > th1 \qquad (1)$$

where th1 is an empirically defined threshold (th1>1).

That is, if inequality (1) holds, the CPU 104 advances the process to step S3008 to execute the correction processing of the tooth image; otherwise, it skips the correction processing of the tooth image, thus ending the processing.

Upon execution of the correction processing of the tooth image, the CPU 104 calculates a correction parameter P upon correction of the tooth image (S3008), and corrects the values of pixels included in the tooth image using the correction parameter P (S3009). Note that the CPU 104 stores the corrected (or uncorrected) image data in a predetermined area of the HDD 102, and outputs the image data to an external apparatus or displays an image represented by the image data on the display unit 103 according to user's instructions.

Detection of Tooth Image (S3003)

Figure 3:
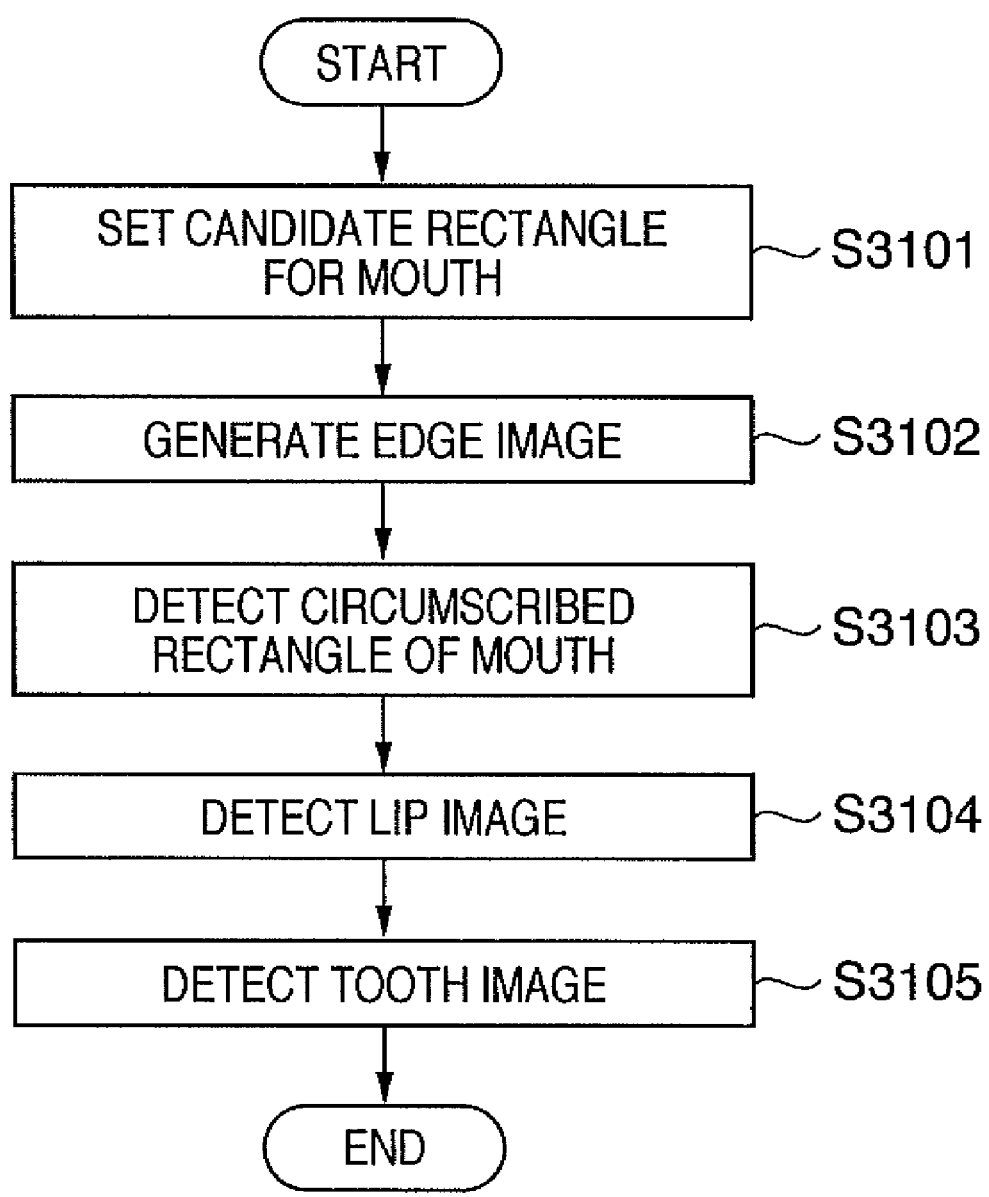
FIG. 3 is a flowchart for explaining detection of a tooth image.

FIG. 3 is a flowchart for explaining detection of a tooth image.

The CPU 104 sets a rectangular region (to be referred to as a candidate rectangle for the mouth) 11 that surrounds an image region of a mouth (to be referred to as a mouth image hereinafter) shown in FIG. 4 on a face image 10 detected in step S3002 (S3101). The position of a mouth image is statistically calculated in advance based on the detection results of face images, and the candidate rectangle for the mouth 11 is set based on the statically calculated position of the mouth image.

The candidate rectangle for the mouth 11 set in set in step S3101 merely surrounds the statistical position of a mouth image, and is not a rectangular region that circumscribes the mouth image on the face image 10. Hence, the CPU 104 detects a rectangular region that circumscribes the mouth image (to be referred to as a circumscribed rectangle of the mouth hereinafter) in the subsequent processes.

In order to detect the circumscribed rectangle of the mouth, the CPU 104 generates an edge image in the candidate rectangle for the mouth 11 (S3102). The edge image is generated by detecting edges using at least one of brightness, chroma, and hue values as a feature amount.

The CPU 104 detects the circumscribed rectangle of the mouth by analyzing the generated edge image (S3103).

FIG. 5 is a view for explaining the method of obtaining line segments that contact the edges of a mouth image. Note that the mouth image shown in FIG. 5 corresponds to the edge image in the candidate rectangle for the mouth 11.

As shown in FIG. 5, the number of edges is small on the outer side of the mouth image, and a large number of edges corresponding to teeth, lips, and the like exist on the inner side of the mouth image. Therefore, the circumscribed rectangle of the mouth can be detected by detecting a region including many edges from the edge mage in the candidate rectangle for the mouth 11.

A line segment CD shown in FIG. 5 equally divides the candidate rectangle for the mouth 11 into right and left regions. The CPU 104 counts the number Ecd of pixels which form edges on the line segment CD. Note that pixels which form edges will be referred to as "edge pixels", and the number of edge pixels will be referred to as "the number of edges" hereinafter. Next, the CPU 104 counts the number Eef of edges from an upper left point E to a lower left point F of the candidate rectangle for the mouth 11 in the vertical direction. The CPU 104 then checks if the numbers Eef and Ecd of edges satisfy:

$$Eef/Ecd > th2 \quad (2)$$

where th2 is a predetermined threshold (0<th2<1).

If inequality (2) does not hold, the CPU 104 sets, as the count start point of the number of edges, a point E+1 which shifts from the point E by one coordinate in the direction of a point C. Likewise, the CPU 104 sets, as the count end point, a point F+1 which shifts from the point F by one coordinate (one pixel) in the direction of a point D. The CPU 104 recounts the number Eef of edges from the point E+1 to the point F+1 in the vertical direction. The CPU 104 repeats the rightward shift of the count start and end points and re-counting until inequality (2) holds.

If inequality (2) holds, the CPU 104 sets the count start and end points E+n and F+n at that time as the ends on the left side (facing the image) of the circumscribed rectangle of the mouth, in other words, the positions of the left side of the circumscribed rectangle of the mouth.

Next, the CPU 104 counts the number Egh of edges from an upper right point G to a point H of the candidate rectangle for the mouth 11 in the vertical direction. The CPU 104 then checks if the numbers Egh and Ecd of edges satisfy:

$$Egh/Ecd > th2 \quad (3)$$

The CPU 104 repeats the leftward shift of the count start and end points and re-counting until inequality (3) holds. If inequality (3) holds, the CPU 104 sets the count start and end points G-n and H-n at that time as the ends on the right side of the circumscribed rectangle of the mouth, in other words, the position of the right side of the circumscribed rectangle of the mouth.

The CPU 104 similarly obtains the upper and lower sides of the circumscribed rectangle of the mouth. That is, the CPU 104 counts the number Eij of edges on a line segment IJ which equally divides the candidate rectangle for the mouth 11 into upper and lower regions. Next, the CPU 104 counts the number Eeg of edges from the point E to the upper right point G of the candidate rectangle for the mouth 11 in the horizontal direction, and checks if the numbers Eeg and Eij of edges satisfy:

$$Eeg/Eij > th3 \quad (4)$$

where th3 is a predetermined threshold (0<th3<1).

The CPU 104 repeats the downward shift of the count start and end points and re-counting until inequality (4) holds. If inequality (4) holds, the CPU 104 sets the count start and end points E+n and G+n at that time as the ends on the upper side of the circumscribed rectangle of the mouth, that is, the positions of an upper side of the circumscribed rectangle of the mouth.

The CPU 104 then counts the number Efh of edges from the lower right point F to the point H of the candidate rectangle for the mouth 11 in the horizontal direction, and checks if the numbers Efh and Eij of edges satisfy:

$$Efh/Eij > th3 \quad (5)$$

The CPU 104 repeats the upward shift of the count start and end points and re-counting until inequality (5) holds. If inequality (5) holds, the CPU 104 sets the count start and end points F-n and H-n at that time as the ends on the lower side of the circumscribed rectangle of the mouth, that is, the positions of a lower side of the circumscribed rectangle of the mouth.

In the description of the above example, the numbers of edges on the line segments CD and IJ are to be compared. For example, the average numbers of edges of a plurality of lines near the line segments CD and IJ may be used.

Figure 6:
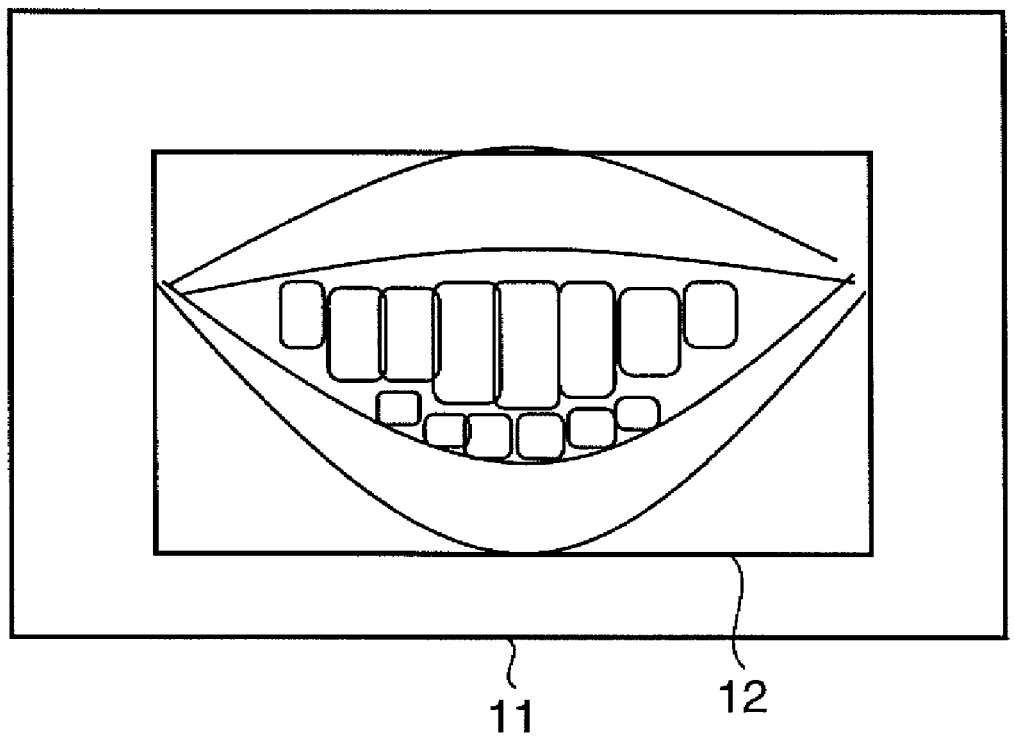
FIG. 6 shows the relationship between a candidate rectangle and circumscribed rectangle of the mouth.

FIG. 6 shows the relationship between the candidate rectangle for the mouth 11 and a circumscribed rectangle of the mouth 12.

Next, the CPU 104 detects a tooth image. The tooth image may be detected from color information of pixels in the circumscribed rectangle of the mouth 12, but a skin portion near the four corners of the circumscribed rectangle of the mouth 12 may be unwantedly included by simple detection using only color information. Hence, the CPU 104 detects feature points of an image region of an image region of lips (to be referred to as a lip image hereinafter) to detect a lip image in outline (S3104). The CPU 104 then detects a tooth image surrounded by the lip image using color information.

In order to detect the lip image, the CPU 104 obtains the feature points of the lip image. The CPU 104 obtains six points P1 to P6 shown in, for example, FIG. 7. The CPU 104 then detects a hexagon (indicated by the broken line in FIG. 7) formed by connecting these points as the lip image.

Figure 7:
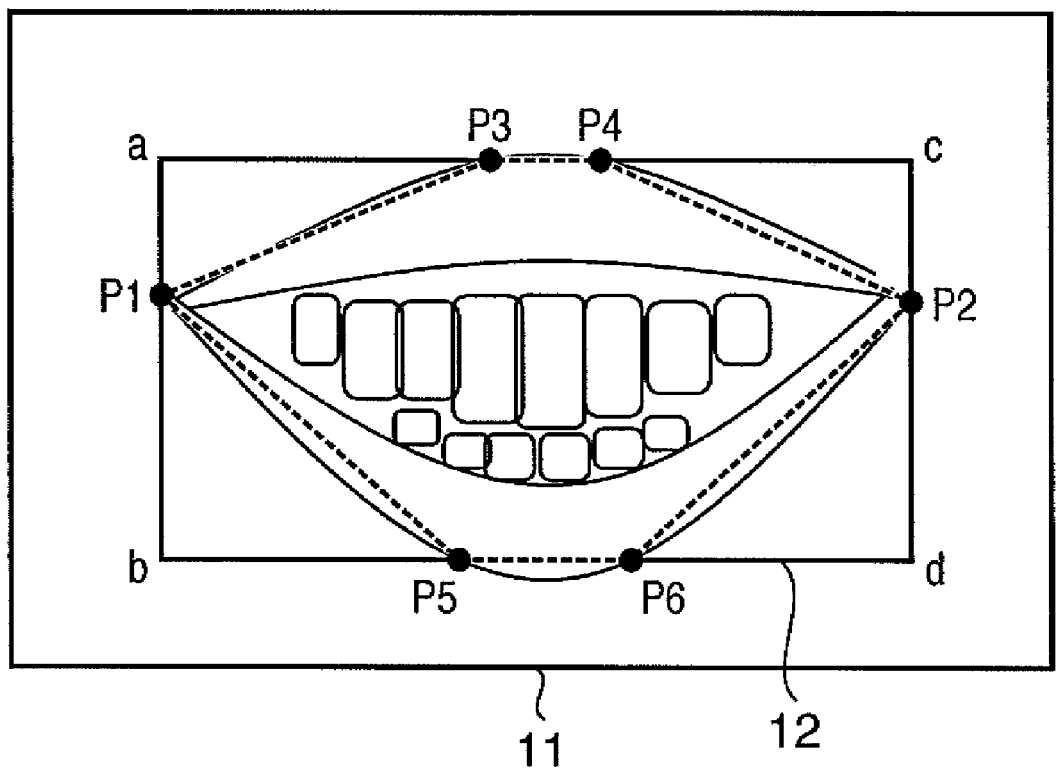
FIG. 7 is a view for explaining detection of a lip image.

A feature point P1 shown in FIG. 7 is an edge pixel which is detected first by detecting edge pixels from an upper left point a to a point b of the circumscribed rectangle of the mouth 12 in the vertical direction. Likewise, a feature point P2 is an edge pixel which is detected first by detecting edge pixels from a point c to a point d in the vertical direction.

A feature point P3 is an edge pixel which is detected first by detecting edge pixels from the point a to the point c in the horizontal direction. A feature point P4 is an edge pixel which is detected first by detecting edge pixels from the point c to the point a in the horizontal direction. A feature point P5 is an edge pixel which is detected first by detecting edge pixels from the point b to the point d in the horizontal direction. A feature point P6 is an edge pixel which is detected first by detecting edge pixels from the point d to the point c in the horizontal direction. In this case, the CPU 104 detects a hexagon formed by connecting the feature points in the order of P1, P3, P4, P2, P6, P5, and P1 as the lip image in outline.

In the description of the above example, the edge pixel which is detected first is defined as a feature point of the lip image. Alternatively, when the predetermined number of edge pixels are successively detected, one of these edge pixels may be defined as a feature point.

The CPU 104 detects pixels of a tooth image (to be referred to as tooth pixels hereinafter) included in the lip image, and defines a set of detected tooth pixels as a tooth image (S3105). For example, the CPU 104 detects tooth pixels by analyzing a histogram of hues of pixels in the lip image.

Figure 8:
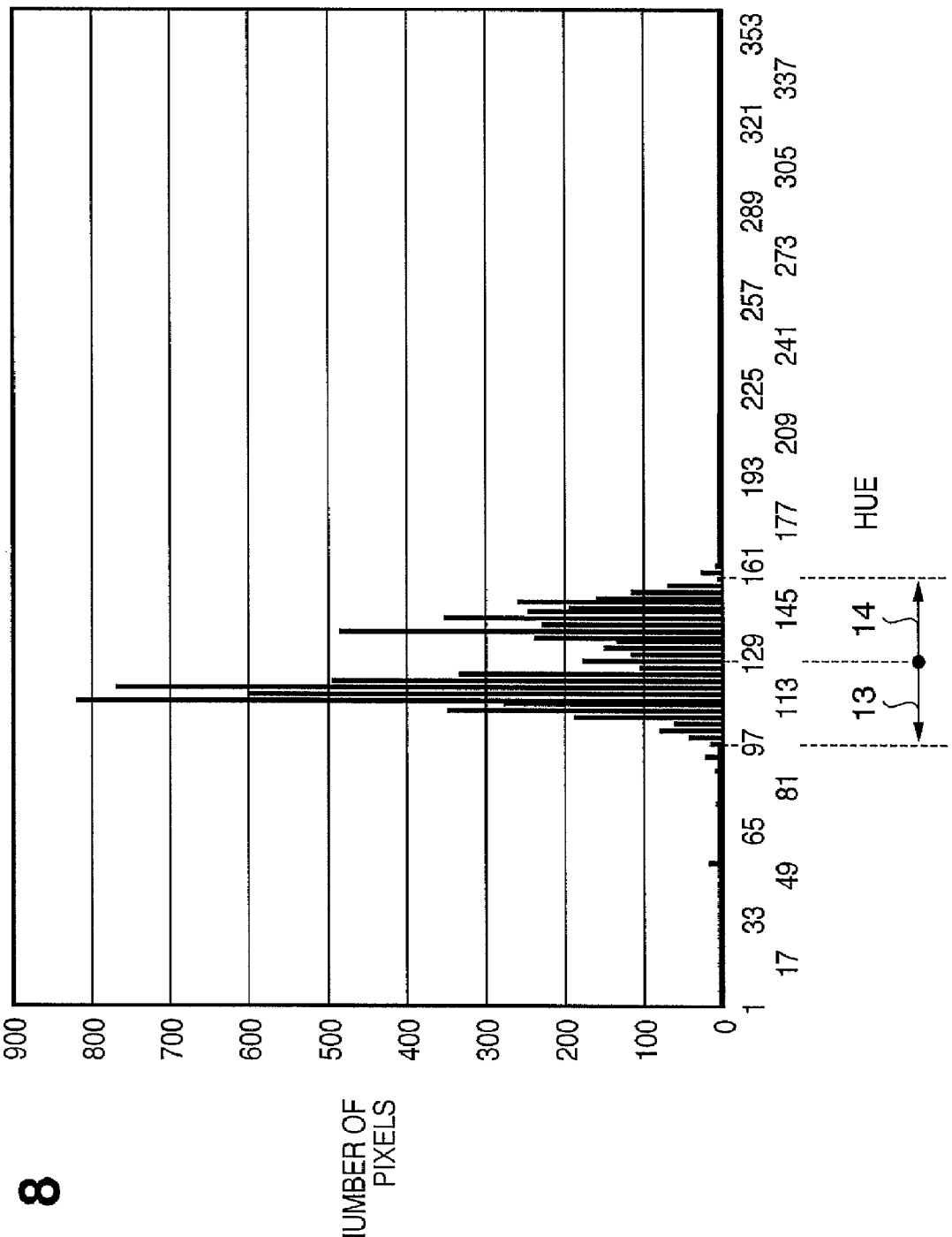
FIG. 8 shows a histogram example of the lip image.

FIG. 8 shows a histogram example of the lip image. In FIG. 8, the ordinate plots the number of pixels, and the abscissa plots the hue angle which represents blue at 0° (360°) and yellow at 180°.

Since the lip image includes only the lip image and tooth image, two peaks must normally appear in the hue histogram of the lip image. In consideration of the hues of the lip image and tooth image, one closer to red of two peaks must be configured by pixels of the lip image (to be referred to as lip pixels hereinafter), and the other peak must be configured by tooth pixels. Therefore, in the example of FIG. 8, a hue range 13 close to red corresponds to lip pixels, and the other hue range 14 corresponds to tooth pixels.

That is, a hue histogram of the lip image is generated, and two peaks are selected in descending order of frequency of occurrence, thus obtaining a hue range including lip pixels and that include tooth pixels based on these peak positions (hues) and hue ranges.

Therefore, the CPU 104 detects pixels included in the hue range of tooth pixels from the lip image to define a set of detected tooth pixels as a tooth image.

In the description of the above example, the hue levels are focused as an example of discrimination, and the tooth pixels in the lip image are detected using the hue histogram. However, the chroma levels may be focused to detect low-chroma pixels as tooth pixels.

Calculation of Average Chroma of Tooth Image (S3004)

Figure 9:
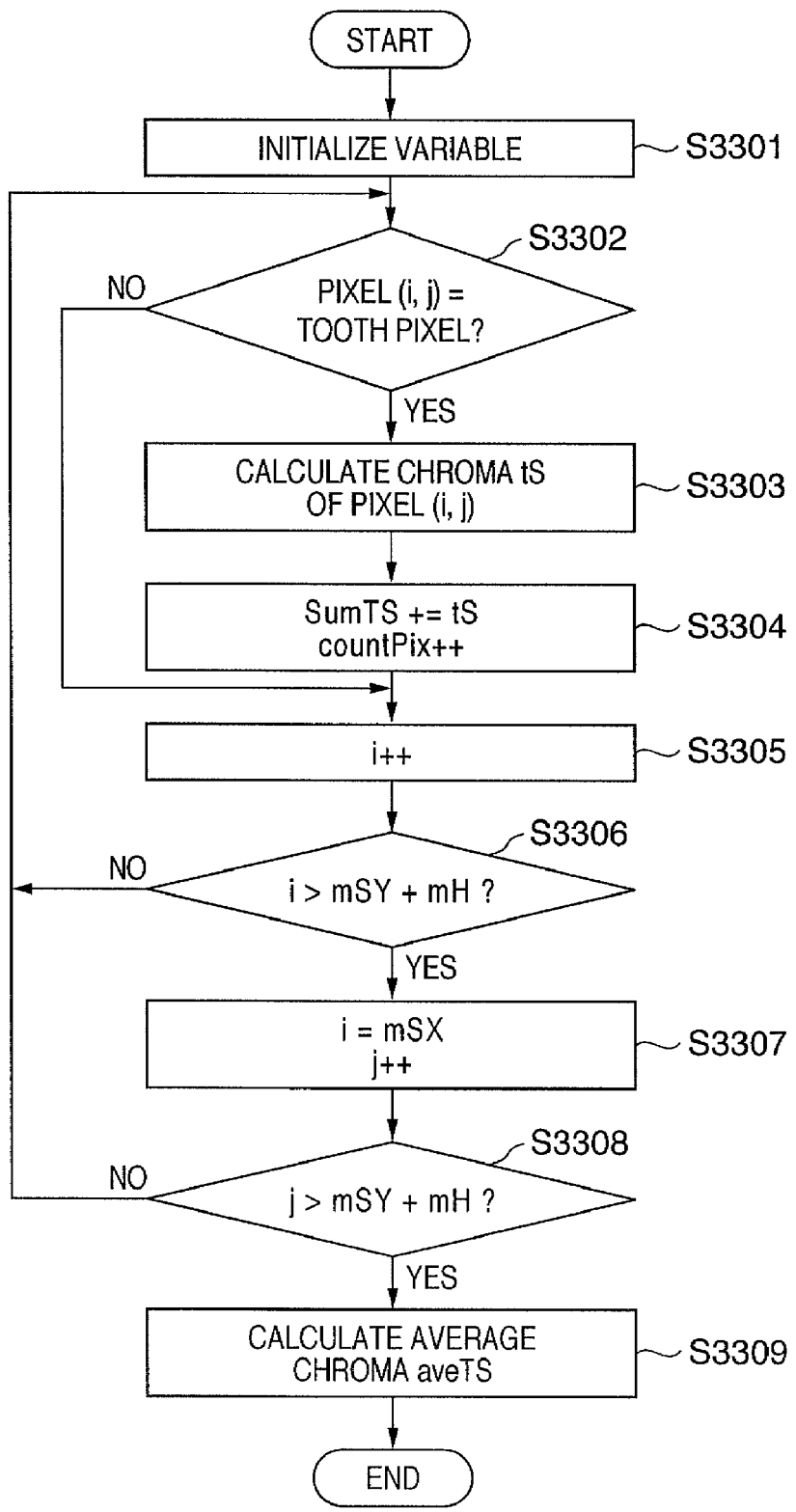
FIG. 9 is a flowchart for explaining a method of calculating the average chroma value of a tooth image.

FIG. 9 is a flowchart for explaining the calculation method of the average chroma of the tooth image.

Figure 10:
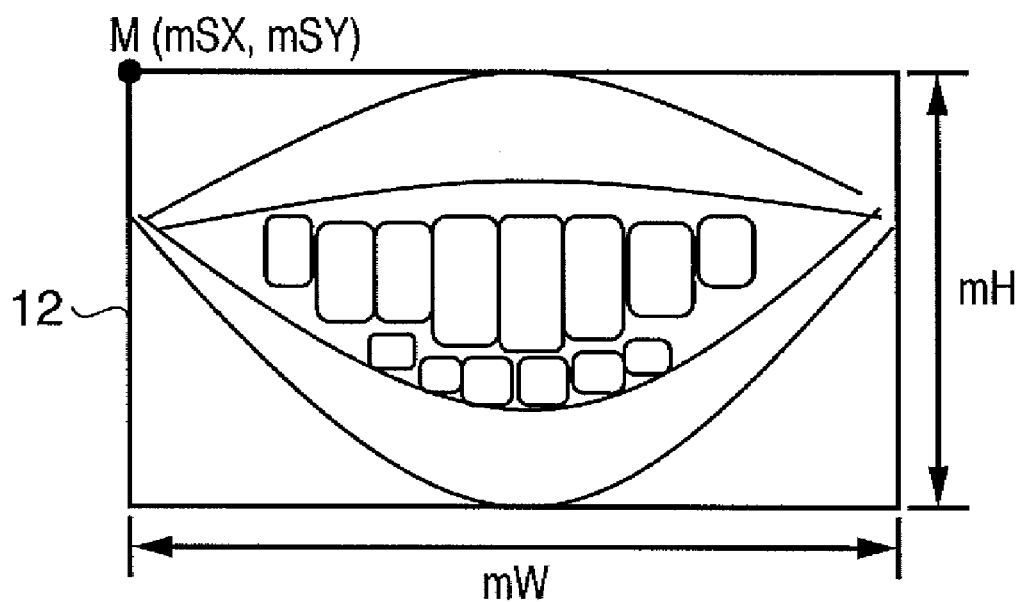
FIG. 10 shows a circumscribed rectangle of the mouth.

The CPU 104 sets upper left coordinates (mSX, mSY) of the circumscribed rectangle of the mouth 12 detected in step S3103 in variables (i, j) indicating the coordinates on the image. The CPU 104 resets a variable SumTS indicating the sum of chroma values and a variable countPix representing the count value of tooth pixel to zero (S3301). Note that the coordinates (mSX, mSY) are the coordinate values of a coordinate system which has an upper left corner of an original image as an origin. FIG. 10 shows the circumscribed rectangle of the mouth 12 which has the coordinates (mSX, mSY) as a point M, and a width=mW pixels and height=mH pixels.

Figure 11:
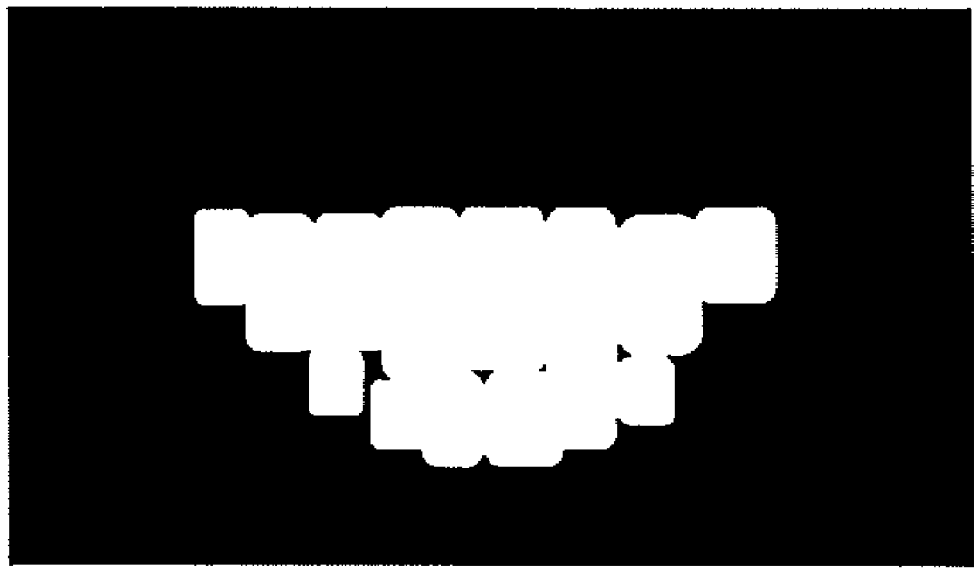
FIG. 11 shows a binary mask image of tooth region.

The CPU 104 then checks if the pixel at the coordinate (i, j) (to be referred to as a pixel (i, j) hereinafter is the tooth pixel detected in step S3003 (S3302). This checking step is implemented by generating a binary mask image, which represents the detection result and is shown in FIG. 11, based on the detection result of the tooth image in step S3003, and referring to the values of pixels (i, j) of the binary mask image. In the example shown in FIG. 11, the CPU 104 determines that a white pixel is the tooth pixel, and that a black pixel is not the tooth pixel. If the CPU 104 determines that the pixel (i, j) is a tooth pixel, the process advances to step S3303; otherwise, the process jumps to step S3305.

If the pixel (i, j) is a tooth pixel, the CPU 104 calculates a chroma tS based on the RGB values of the pixel (i, j) (S3303) by:

$$Cb = -0.1687 \times R - 0.3316 \times G + 0.5000 \times B$$

$$Cr = 0.5000 \times R - 0.4186 \times G - 0.0813 \times B$$

$$tS = \sqrt{(Cb^2 + Cr^2)} \tag{6}$$

The CPU 104 adds the chroma tS to the variable SumTS and increments the variable countPix (S3304).

The CPU 104 increments a variable i to shift the reference position by one pixel in the horizontal direction (S3305), and compares the variable i with a right side mSX+mW of the circumscribed rectangle of the mouth 12 (S3306) If i≦mSX+mW, the process returns to step S3302. If i>mSX+mW, the CPU 104 determines that the reference position falls outside the circumscribed rectangle of the mouth 12, and the process advances to step S3307.

The CPU 104 sets the variable i in mSX, increments a variable j to shift the reference position by one pixel in the vertical direction (S3307), and compares the variable j with a lower side mSY+mH of the circumscribed rectangle of the mouth 12 (S3308). If j≦mSY+mH, the process returns to step S3302. If j>mSY+mH, the CPU 104 determines that the reference position falls outside the circumscribed rectangle of the mouth 12, and the process advances to step S3309.

The CPU 104 then calculates the average chroma aveTS of the tooth image based on the variables SumTS and countPix (S3309) by:

$$aveTS = SumTS/countPix \tag{7}$$

Detection of White Eye Image (S3005)

Next, the method of detecting a white eye image of an eye on the left side (as one faces) of the face image will be described below. Also, a white eye image of an eye on the right side is detected by the same method.

Figure 12:
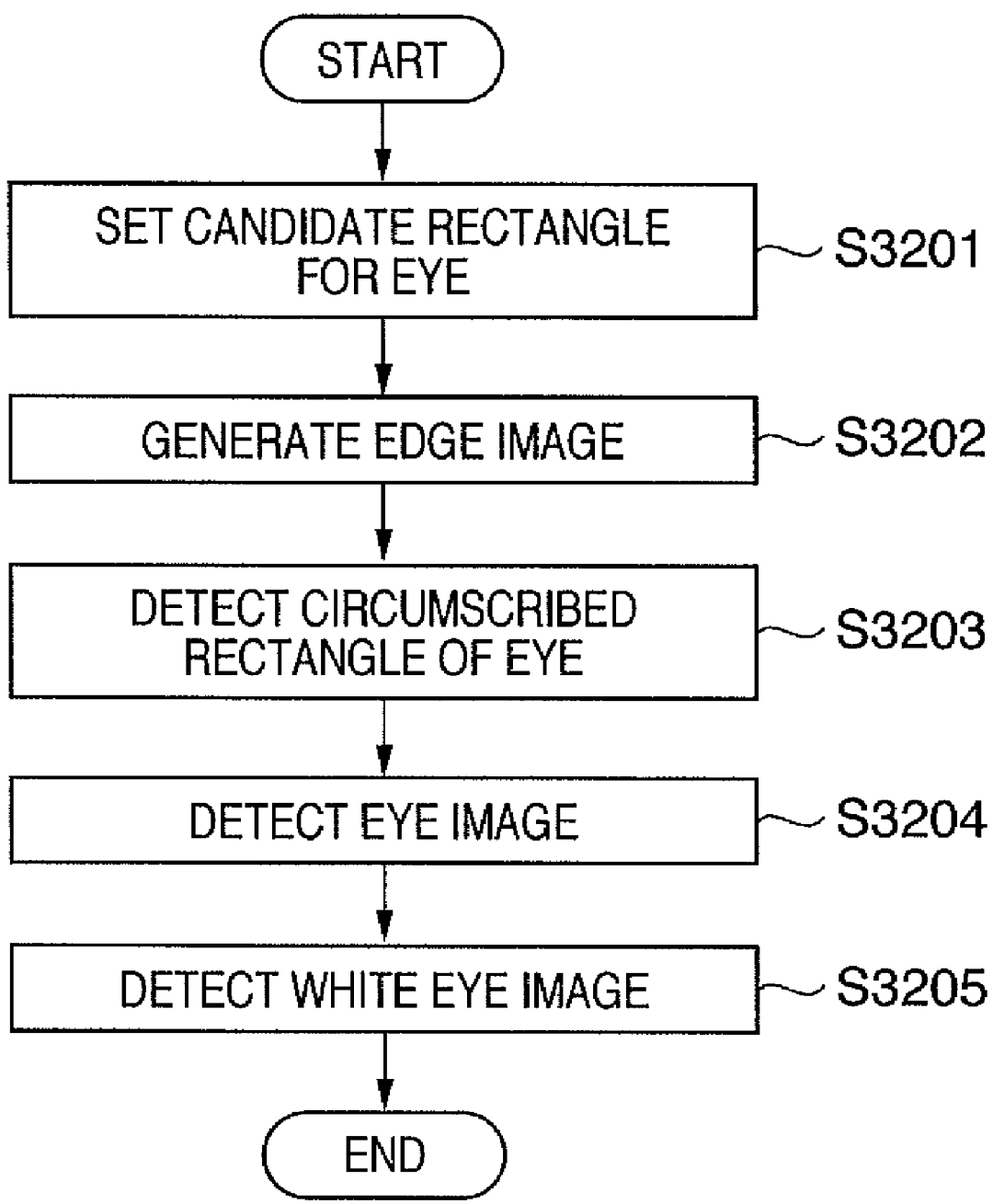
FIG. 12 is a flowchart for explaining detection of a white eye image.

FIG. 12 is a flowchart for explaining detection of a white eye image.

The CPU 104 sets a rectangular region 15 that surrounds an image region of eye (to be referred to as an eye image hereinafter) (to be referred to as a candidate rectangle for eye hereinafter) shown in FIG. 13 on the face image 10 detected in step S3002 (S3201). The position of an eye image is statistically calculated in advance based on the detection results of face images, and the candidate rectangle for eye 15 is set based on the statistically calculated position of the eye image, as in the candidate rectangle for the mouth 11.

The candidate rectangle for eye 15 set in step S3201 merely surrounds the statistical position of an eye image, and is not a rectangular region that circumscribes an eye image on the face image 10. Hence, the CPU 104 detects a rectangular region that circumscribes the eye image (to be referred to as a circumscribed rectangle of eye hereinafter) by the following processes.

In order to detect the circumscribed rectangle of the eye, the CPU 104 generates an edge image in the candidate rectangle for the eye 15 (S3202). Since the method of detecting the circumscribed rectangle of the eye is the same as that of detecting the circumscribed rectangle of the mouth 12 described in steps S3102 and S3103, a detailed description thereof will not be repeated.

FIG. 14 shows the relationship between the candidate rectangle for the eye 15 and a circumscribed rectangle of the eye 16.

Next, the CPU 104 detects a white eye image. The white eye image may be detected from color information of pixels in the circumscribed rectangle of eye 16, but a skin portion near the four corners of the circumscribed rectangle of the eye 16 may be included by simple detection using only color information. Hence, the CPU 104 detects feature point of an eye image to detect an eye image in outline (S3204) Since the detection method of the eye image is the same as that of the lip image described in step S3104, a detailed description thereof will not be repeated.

FIG. 15 is a view for explaining detection of an eye image. As in the lip image, the CPU 104 detects the eye image as a hexagon formed by connecting feature points in the order of E1, E3, E4, E2, E6, E5, and E1.

The CPU 104 detects pixels of a white eye image (to be referred to as white eye pixels hereinafter) included in the eye image, and defines a set of detected white eye pixels as a white eye image (S3205).

Figure 16:
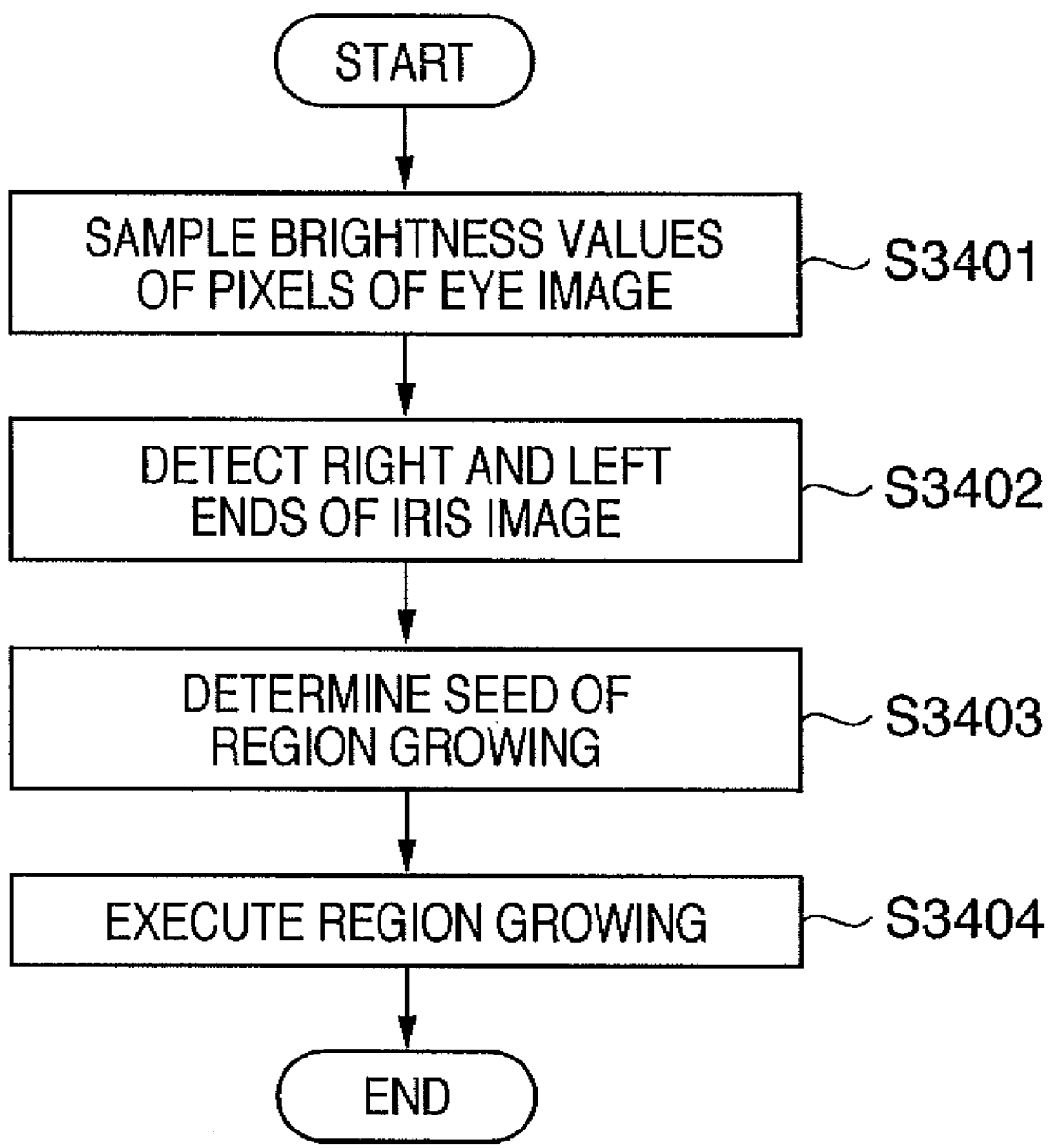
FIG. 16 is a flowchart for explaining the method of detecting a white eye image.

FIG. 16 is a flowchart for explaining the detection method of a white eye image. In this embodiment, as a method of detecting a white eye image from an eye image, a method using a known region growing method will be explained.

Figure 17:
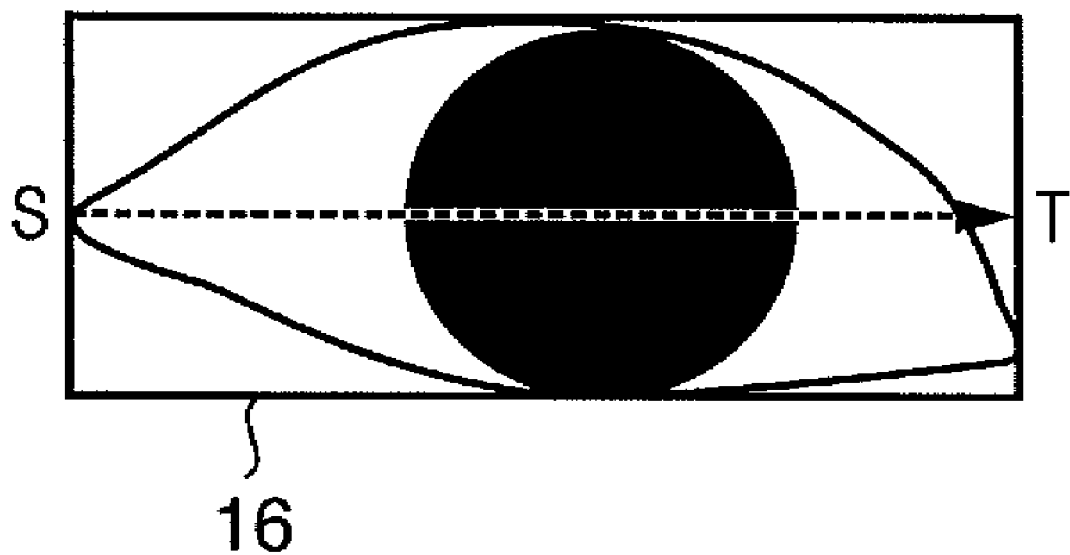
FIG. 17 is a view for explaining the method of detecting a white eye image.
Figure 18:
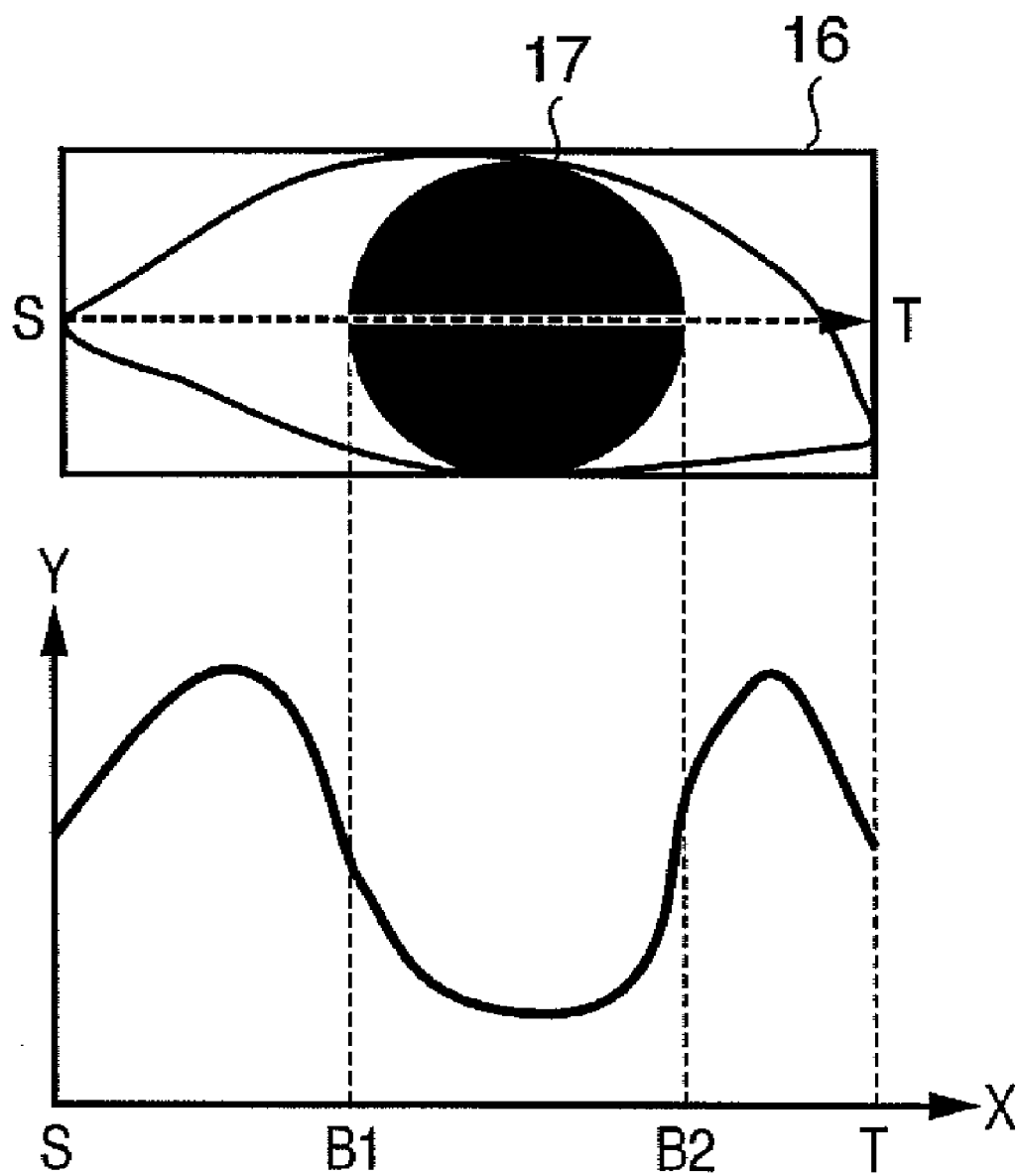
FIG. 18 shows an example of the relationship between an eye image and the brightness values of acquired pixels.

The CPU 104 samples brightness values of pixels which line up in the horizontal direction in the eye image (S3401). For example, as shown in FIG. 17, the CPU 104 sets a line segment ST which equally divides the circumscribed rectangle of the eye 16 into upper and lower regions, and acquires the brightness values of respective pixels from a point S to a point T. FIG. 18 shows an example of the relationship between the eye image and the acquired brightness values of respective pixels. Of course, sampling is not limited to one line, but it may be made for a plurality of lines near the line segment ST.

The CPU 104 then detects the right and left ends of an image region of the iris (to be referred to as an iris image hereinafter) 17 from the acquired brightness values of the respective pixels (S3402). Since the acquired brightness values of the respective pixels are high in a white eye image portion and are low in an iris image portion, as shown in FIG. 18, the positions where the brightness values change abruptly (positions B1 and B2 in FIG. 18) are detected as the boundaries of the white eye image and the iris image 17.

The CPU 104 detects the positions B1 and B2 as follows. For example, when the average of the brightness values of pixels on the line segment ST is aveY, the CPU 104 sets, as B1, a position x where a brightness value Y(x) scanned from a point S to a point T shown in FIG. 18 satisfies:

$$Y(x) > Y(x+1) \text{ and } Y(x+1) < aveY \tag{8}$$

and it sets, as B2, a position x where a brightness value Y(x) scanned from the point T to the point S satisfies:

$$Y(x+1) > Y(x) \text{ and } Y(x) < aveY \tag{9}$$

The CPU 104 then determines a start point (seed) of region growing based on the left and right ends B1 and B2 of the iris image 17 and the feature points E1 and E2 at the two ends of the eye obtained in step S3204 (S3403).

FIG. 19 is a view for explaining determination of a seed. The CPU 104 calculates a middle point Co of a line segment E1B1 and define it as a seed. Likewise, the CPU 104 defines a middle point Cc of a line segment E2B2 as a seed.

Figure 21:
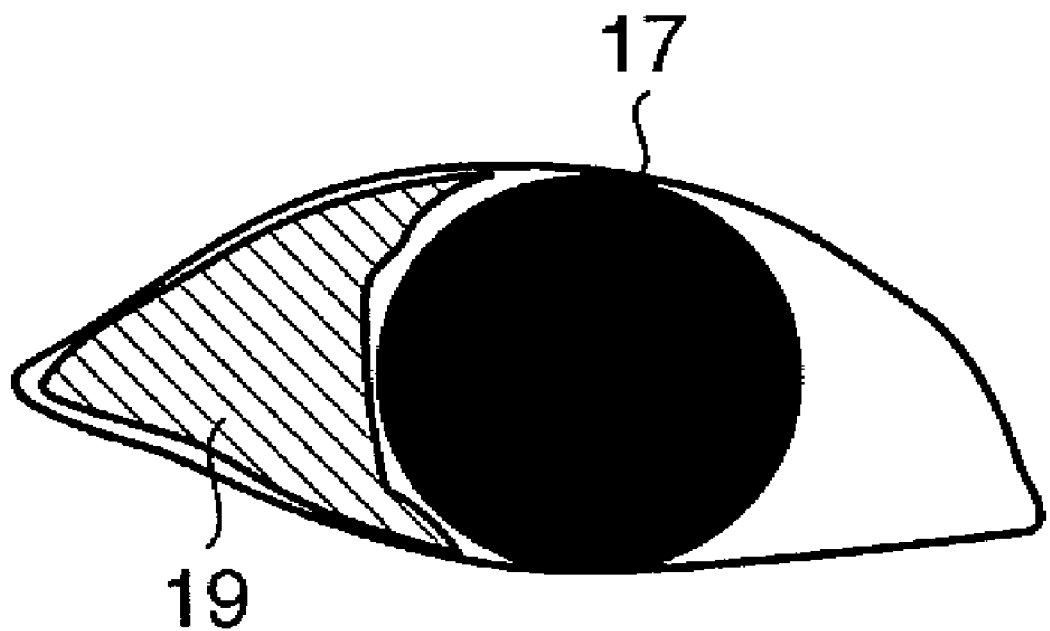
FIG. 21 shows a grown region as a region growing result.
Figure 22:
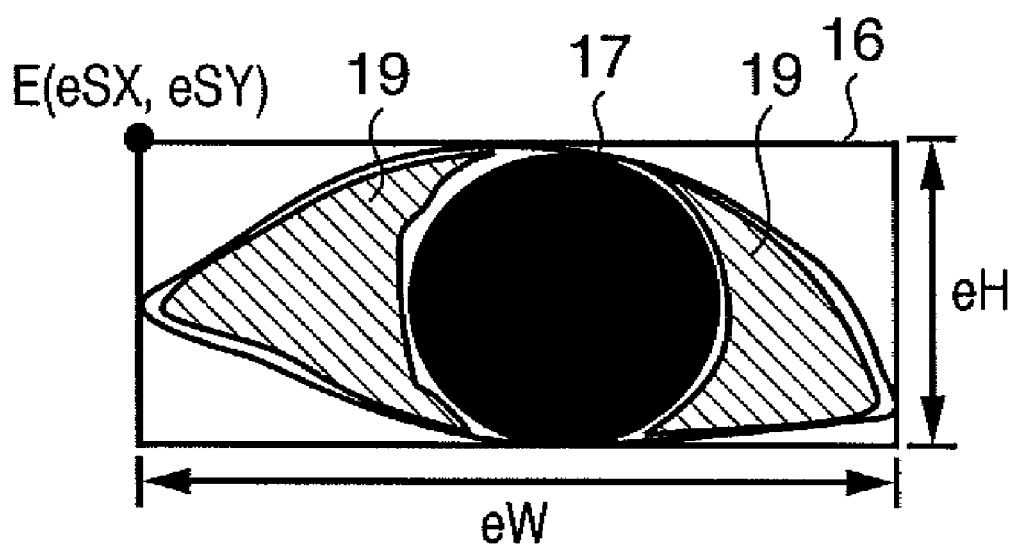
FIG. 22 is a view for explaining the calculation of the average chroma value of a white eye image.

The CPU 104 executes region growing from each determined seed to detect a white eye image (S3404). When the color of the white eye image is close to that of an image region of skin near the eye, a grown region 18 may enter the image region of skin, as shown in FIG. 20. Hence, the CPU 104 defines an image within the eye image detected in step S3204 as a region growing range. FIG. 21 shows a grown region 19 as a result of region growing under such condition. Of course, the CPU 104 similarly executes region growing on the side of the middle point Cc to detect a white eye image.

Calculation of Average Chroma of White Eye Image (S3006)

Figure 23:
FIG. 23 shows a binary mask image a binary mask image of eye region.

The CPU 104 sets the coordinates of an upper left point E of the circumscribed rectangle of the eye 16 calculated in step S3203 to be (eSX, eSY), the width to be eW pixels, and the height to be eH pixels. As in the tooth image shown in FIGS. 10 and 11, the CPU 104 calculates the average chroma aveES of the white eye image using a binary mask image which is shown in FIG. 23 and represents the detection result of the white eye image, by the same method as the calculation method of the average chroma aveTS of the tooth image in step S3005.

However, unlike the tooth image, since a pair of right and left white eye images are normally detected, after the average chroma values aveES of the respective white eye images are calculated, an average value of these averages is defined as the average chroma aveES of the white eye image.

Calculation of Correction Parameter (S3008)

Let aimTS be a target chroma of the tooth image. Then, the target chroma aimTS is expressed as a relative value of the average chroma aveES of the white eye image by:

$$aimTS = a \times aveES \tag{10}$$

where a is a coefficient (a>1).

The coefficient a represents a level to whiten the tooth image relative to the white eye image, and the whiteness of the tooth image becomes close to that of the white eye image as coefficient a is closer to 1. However, when the coefficient a suited to a pale face image is applied to a deep or dark face image, the tooth image tends to be excessively white. Hence, the following equation is defined to set a larger coefficient a for the dark face image compared to the pale face image.

$$a = b \times aveES + c \tag{11}$$

where b and c are empirically defined constants.

From equations (10) and (11), the target chroma aimTS of the tooth image is expressed by:

$$aimTS = (b \times aveES + c) \times aveES \tag{12}$$

The correction parameter P is defined based on the target chroma aimTS and average chroma aveTS of the tooth image by:

$$P = aimTS / aveTS \tag{13}$$

Therefore, upon combining equations (12) and (13), the correction parameter P is given by:

$$P = (b \times aveES + c) \times aveES / aveTS \tag{14}$$

Correction of Tooth Image (S3009)

When correction using the correction parameter P is applied to all tooth pixels, a change in color between corrected and non-corrected pixels near the boundary between the tooth image and lip image cannot become smooth, resulting an unnatural image. To solve this problem, the CPU 104 alpha-blends an original image, and an image obtained by correcting an image inside the circumscribed rectangle of the mouth 12 using a blend mask image shown in FIG. 24, in which the blend ratio gradually lowers from the vicinity of the boundary toward the outer side.

Figure 25:
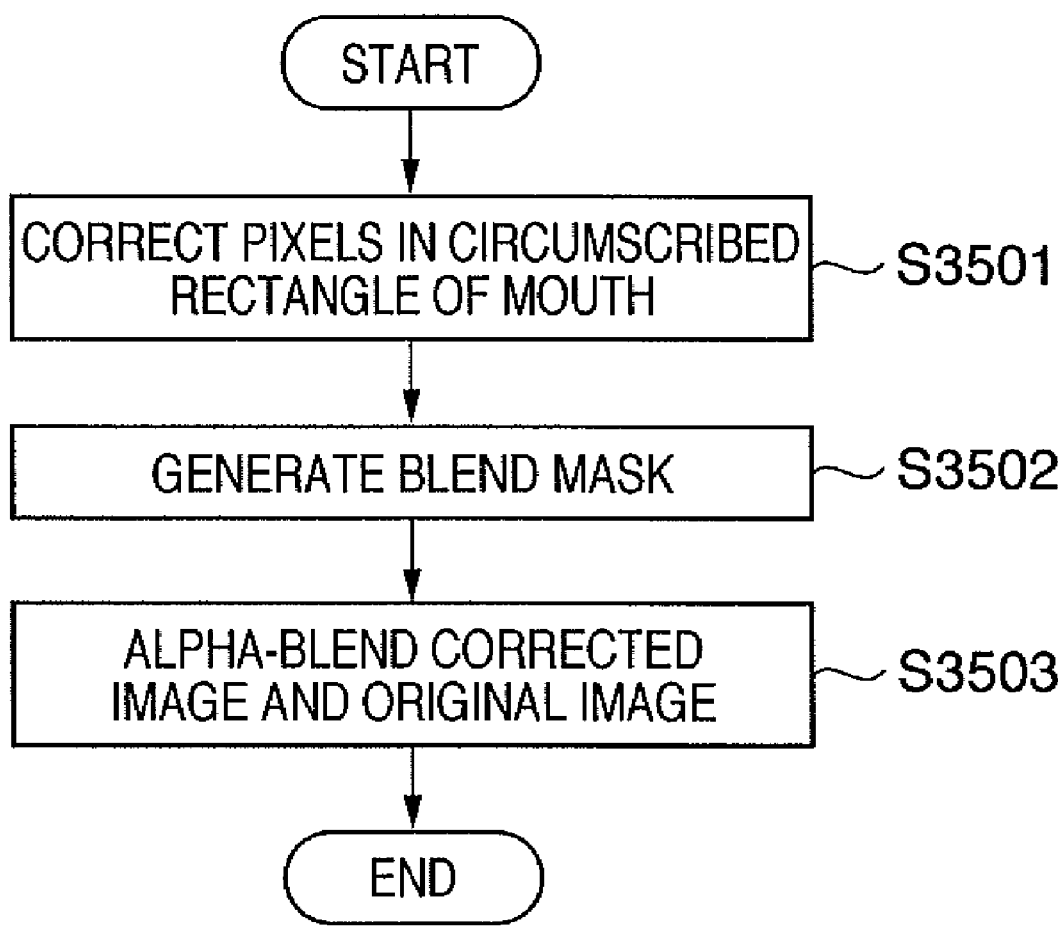
FIG. 25 is a flowchart for explaining correction of a tooth image.

FIG. 25 is a flowchart for explaining correction of the tooth image.

The CPU 104 corrects pixels in the circumscribed rectangle of the mouth 12 using the correction parameter P calculated in step S3008 to generate a corrected image (S3501). Details of the process in step S3501 will be described later.

Figure 24:
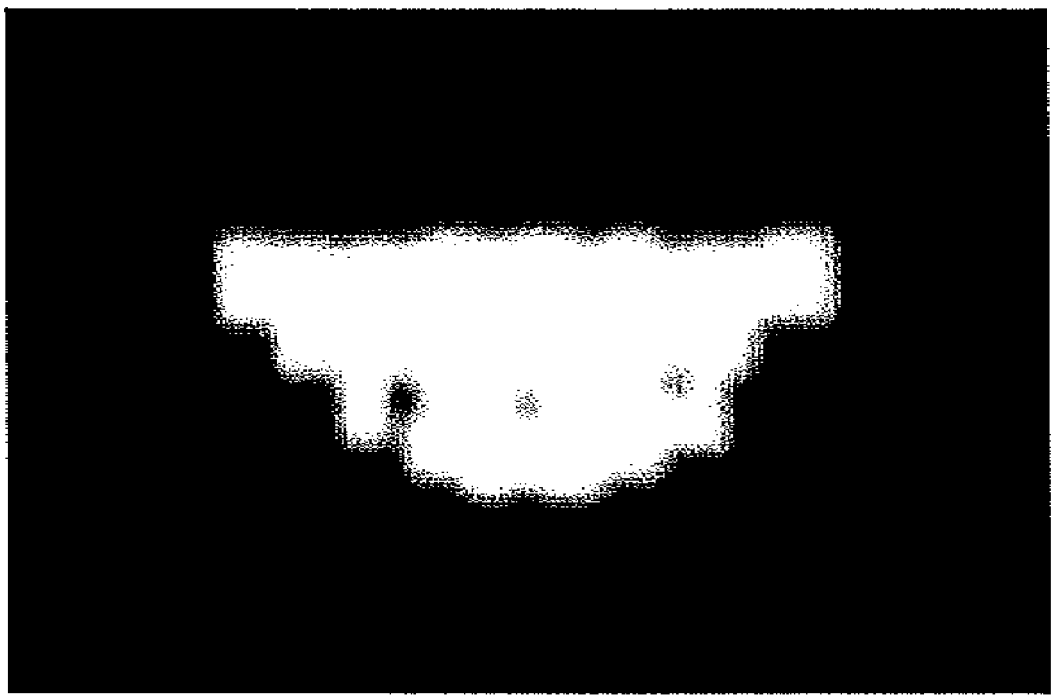
FIG. 24 shows a blend mask image a blend mask image of tooth region.

The CPU 104 then generates a blend mask image shown in FIG. 24, which is used upon alpha-blending the corrected image and original image (S3502). The blend mask image is generated by applying blur filter processing to, for example, the binary mask image shown in FIG. 11. The blend mask image shown in FIG. 24 represents a blend mask in which the blend ratio gradually lowers from the boundary of the tooth image toward the outer side. That is, the blend ratio of the blend mask image is 100% for a white region, 0% for a black region, and falls within a range from 0% to 100% (both exclusive) for a gray region. Also, the blur filter may be a known one and, for example, a Gaussian blur filter or the like may be used.

The CPU 104 alpha-blends the corrected image and original image using the blend mask image (S3503). When the blend ratio=100%, alpha-blending is made to blend the corrected image 100%, thereby blending the corrected image and original image so that the correction strength (correction parameter P) gradually weakens from the boundary of the tooth image toward the outer side. As a result, a natural corrected image can be obtained.

Figure 26:
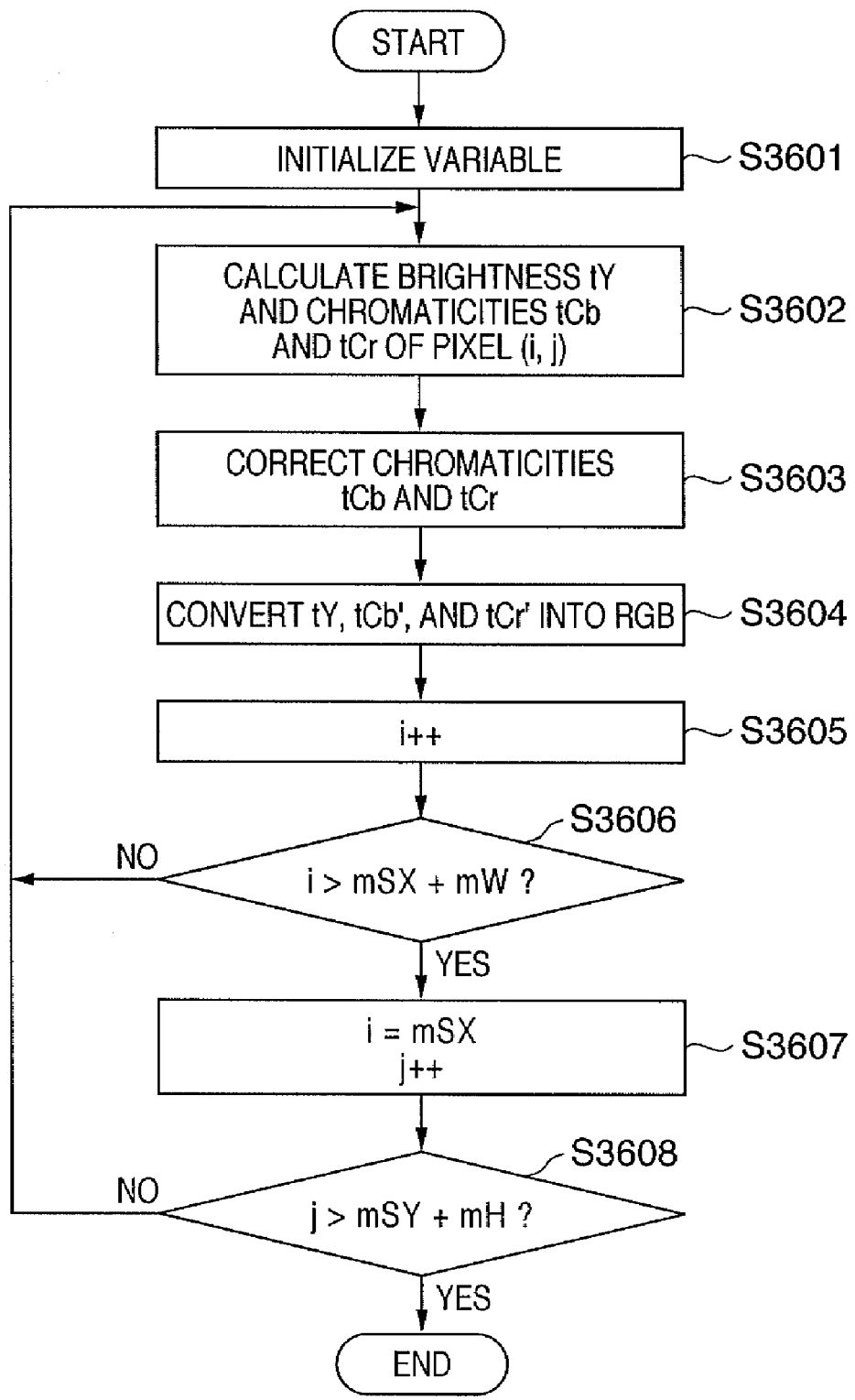
FIG. 26 is a flowchart for explaining generation of a correction image.

FIG. 26 is a flowchart for explaining generation of the corrected image (S3501).

The CPU 104 sets the upper left coordinates (mSX, mSY) of the circumscribed rectangle of the mouth 12 obtained in step S3103 in the variables (i, j) that represent the coordinates on the image (S3601). Note that the coordinates (mSX, mSY) are the coordinate values of a coordinate system which has an upper left corner of an original image as an origin. The width and height of the circumscribed rectangle of the mouth 12 are respectively mW pixels and mH pixels, as shown in FIG. 10.

The CPU 104 calculates a brightness value tY and chromaticity values tCb and tCr based on the RGB values of the pixel (i, j) (S3602) by:

$$tY = 0.2990 \times R - 0.5870 \times G + 0.1140 \times B$$

$$tCb = -0.1687 \times R - 0.3312 \times G + 0.5000 \times B$$

$$tCr = 0.5000 \times R 0.4187 \times G 0.0813 \times B \quad (15)$$

The CPU 104 corrects the chromaticity values tCb and tCr of the pixel (i, j) using the correction parameter P (S3603) by:

$$tCb' = tCb \times P$$

$$tCr' = tCr \times P \quad (16)$$

where tCb' and tCr' are corrected chroma values.

The CPU 104 sets the corrected pixel value of the pixel (i, j) by calculating corrected R'G'B' values from the brightness value tY and the corrected chromaticity values tCb' and tCr' (S3604) using:

$$R' = tY + 1.402 \times tCr'$$

$$G' = tY - 0.344 \times tCb' - 0.714 \times tCr'$$

$$B' = tY + 1.772 \times tCb' \quad (17)$$

The CPU 104 increments the variable i to shift the reference position by one pixel in the horizontal direction (S3605), and compares the variable i with the right side mSX+mW of the circumscribed rectangle of the mouth 12 (S3606). If i≦mSX+mW, the process returns to step S3602. If i>mSX+mW, the CPU 104 determines that the reference position falls outside the circumscribed rectangle of the mouth 12, and the process advances to step S3607.

The CPU 104 resets the variable i to mSX, increments the variable j to shift the reference position by one pixel in the vertical direction (S3607), and compares the variable j with the lower side mSY+mH of the circumscribed rectangle of the mouth 12 (S3608). If j≦mSY+mH, the process returns to step S3602. If j>mSY+mH, the CPU 104 determines that the reference position falls outside the circumscribed rectangle of the mouth 12, thus ending the processing.

As described above, the target value (correction strength) required to correct the tooth image is determined based on the chroma of the white eye image. Therefore, a face image which has a high chroma level as a whole can be prevented from being corrected to an image in which only the tooth image stands out, but can be corrected to have a naturally white tooth image.

Modification of Embodiment

In the description of the above example, the average values of the chroma values of the tooth image and white eye image are calculated to set the target value for correction as a feature amount. However, mode values or median values may be used in place of the average values of the chroma values.

In the description of the above example, the chroma of the tooth image is corrected. However, when the tooth image darkens if only the chroma is corrected, the brightness may be corrected in addition to the chroma. In this case, a representative brightness tY of the tooth image and a representative brightness eY of the white eye image are calculated, and if tY/eY≦th4, the correction parameter may be calculated to correct the brightness of the tooth image. Note that the threshold th4 is an empirically defined value (0<th4<1). The correction parameter in this case is set by the method given by equations (11) to (14), so that the brightness tY of the tooth image increases with increasing brightness eY of the white eye image.

The parameter P is calculated from the target chroma aimTS calculated according to the average chroma aveES of the white eye image, and the average chroma aveTS of the tooth image. Alternatively, the correction parameter may be simply calculated using only the average chroma aveES of the white eye image. In this case, the ratio of lowering the average chroma aveTS of the tooth image is defined as the correction parameter P, as described by:

$$P = g \times aveES + f \quad (18)$$

where g and f are empirically defined constants.

When the constants g and f are set so that the value of the correction parameter P falls within the range from 0.0 to 1.0, the ratio of lowering the chroma of the tooth image can be reduced with increasing average chroma aveES of the white eye image, and the correction processing having the same effect as in the first embodiment can be implemented. In this case, since the average chroma aveTS of the tooth image is not used in the calculation of the correction parameter P, the process for calculating the average chroma aveTS of the tooth image can be omitted.

A user interface used to detect a tooth image and white eye image may be provided, and after the user sets the candidate rectangle for the mouth 11 and candidate rectangle for eye 15 which respectively surrounds the tooth image and white eye image, the circumscribed rectangle of the mouth 12 and circumscribed rectangle of eye 16 may be detected by the aforementioned method.

When a face image 21 has a tilt with respect to an entire image 20, as shown in FIG. 27, after the face image 21 is detected in step S3002, a face image 22 whose tilt is corrected is generated. The processes in steps S3101 to S3104 or those in steps S3201 to S3204 are applied to the tilt-corrected face image 22, thus extracting the feature points of an eye image or lip image.

After that, by rotating the coordinate values of the eye or lip image in the reverse direction (by inversely correcting them), the coordinate values of the feature points on the original image are obtained. The processes in step S3105 or S3202 are executed using the coordinate values of the feature points on the original image, and the original image, thus detecting the eye or lip image. The processes in steps S3004 and S3006 to S3009 are executed for the detected eye or lip image.

The method of generating an image by correcting the tilt of an image is as follows.

Assume that the upper left coordinates of a rectangle that surrounds the face image 21 are B1 (BX1, BY1) when the rectangle that surrounds the face image 21 has a tilt of an angle θ with respect to the vertical axis of the image 20, as shown in FIG. 27. Then, the relationship between a coordinate system (X, Y) of the tilt-corrected face image 22 and a coordinate system (x, y) of the original image is described by:

$$X = (-BX1)\cos\theta - (y-BY1)\sin\theta + BX1$$

$$Y = (-BX1)\sin\theta + (y-BY1)\cos\theta + BY1 \quad (19)$$

The inverse conversion is described by:

$$x = (X-BX1)\cos\theta + (Y-BY1)\sin\theta + BY1$$

$$y = (Y-BY1)\cos\theta - (X-BX1)\sin\theta + BY1 \quad (20)$$

By calculating the coordinate values of the original image corresponding to those of the tilt-corrected face image 22 using equations (20), the tilt face image 21 can be corrected.

Second Embodiment

Image processing according to the second embodiment will be described hereinafter. Note that the same reference numerals in the second embodiment denote the same components as those in the first embodiment, and a detailed description thereof will not be repeated.

When one closes his or her eyes or has very narrow eyes even if he or she opens them, white eye images cannot be detected. In such a case, a tooth image is corrected based on the chroma of an image region of skin (to be referred to as a skin region hereinafter) of a face image. The second embodiment will explain the method of determining a target value required to correct the tooth image by analyzing the chroma of the skin region.

Figure 28:
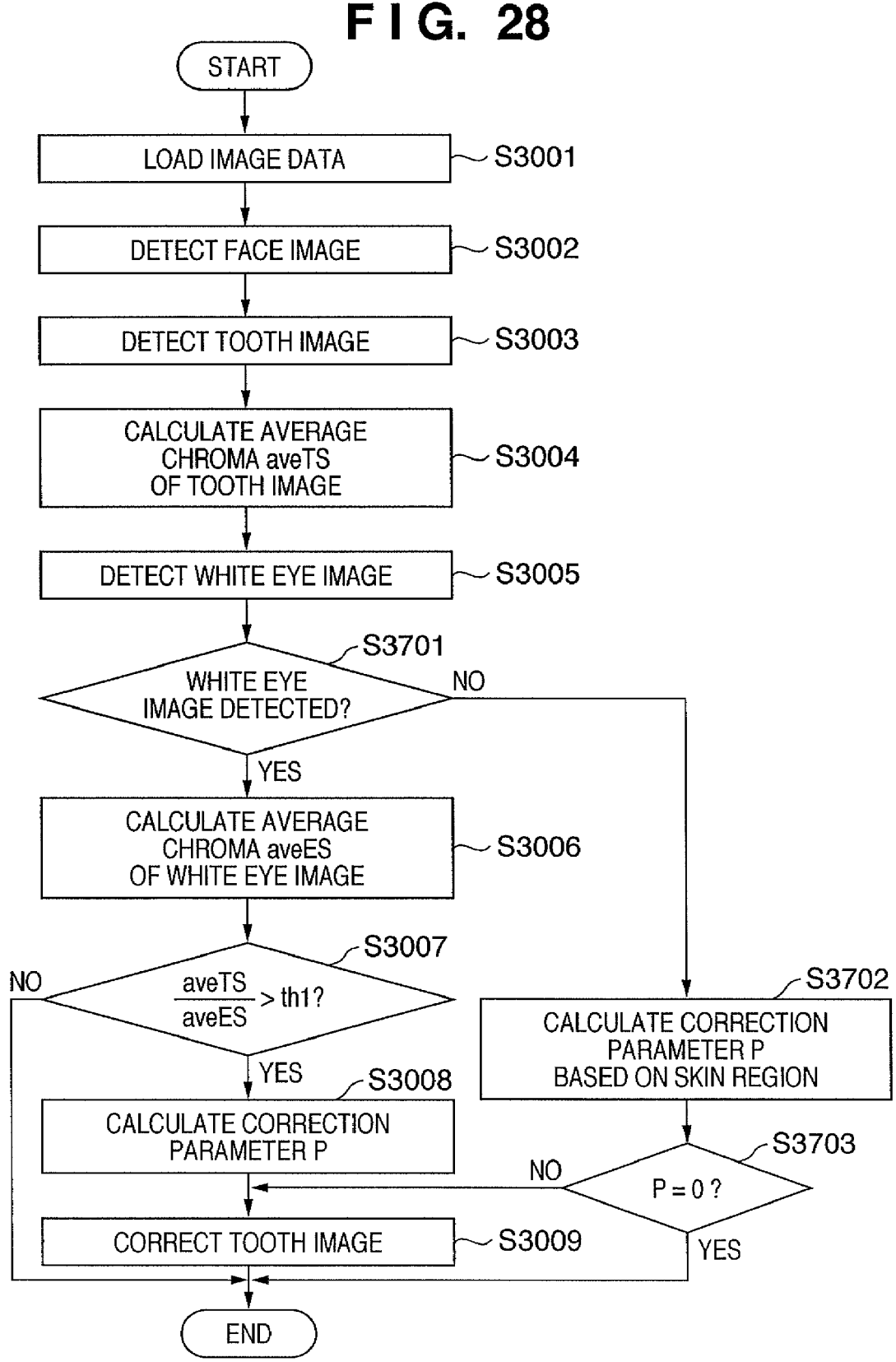
FIG. 28 is a flowchart for explaining image processing according to the second embodiment.

FIG. 28 is a flowchart for explaining the image processing of the second embodiment, which is executed by the CPU 104.

The CPU 104 checks if the white eye image can be detected (S3701). For example, the CPU 104 compares the height eH of the circumscribed rectangle of the eye 16 detected in step S3203 with a predetermined threshold thE, and if eH<thE, it determines that the white eye image cannot be detected. Alternatively, the CPU 104 compares an area Se of the white eye image detected by the region growing processing in step S3404 with a predetermined threshold thS, and if Se<thS, it determines that the white eye image cannot be detected. Note that the white eye images include four regions, that is, those on the inner side (nose side) of the right and left eyes, and those on the outer side, and if at least one of these regions can be detected, it may be determined that the white eye image is detected.

If the white eye image can be detected, the CPU 104 advances the process to step S3006. If the white eye image cannot be detected, the CPU 104 calculates the correction parameter P based on the skin region (S3702). The CPU 104 checks the correction parameter P (S3703), and if P≠0, the CPU 104 advances the process to step S3009 to execute the correction processing of the tooth image; if P=0, it skips the correction processing of the tooth image, thus ending the processing.

Figure 29:
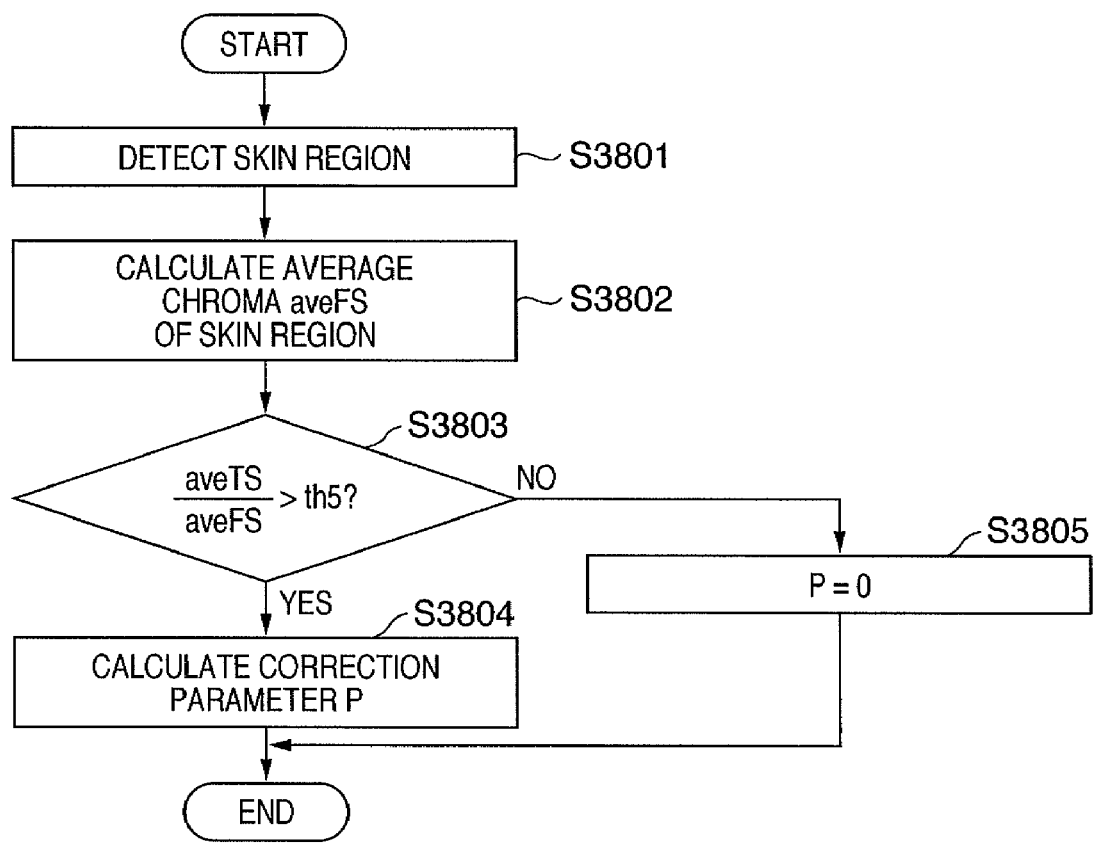
FIG. 29 is a flowchart for explaining the calculation of a correction parameter based on a skin region.

FIG. 29 is a flowchart for explaining the calculation of the correction parameter P based on the skin region (S3702).

The CPU 104 detects a skin region (S3801). As for detection of the skin region, since there have been proposed many methods such as a method using the color differences and brightness described in, for example, Japanese Patent Laid-Open No. 2004-173328 and Japanese Patent Laid-Open No. 2006-011685, and the like, these techniques may be used.

The CPU 104 calculates an average chroma aveFS of the detected skin region (S3802). The average chroma aveFS of the skin region can be calculated by the same method as that of the process in step S3004 if the tooth image is replaced by the skin region.

The CPU 104 compares the average chroma aveTS of the tooth image with the average chroma aveFS of the skin region, and checks if the tooth image has a color that requires the correction processing (S3803) using:

$$\mathrm{ave}TS/\mathrm{ave}FS > th5 \tag{21}$$

where th5 is an empirically defined threshold (th5<1).

That is, if inequality (21) holds, the CPU 104 advances the process to step S3804 to execute the correction processing of the tooth image; otherwise, it sets the correction parameter P=0 (S3805) to skip the correction processing of the tooth image.

The CPU 104 then calculates the correction parameter P (S3804). Let aimTS be a target chroma of the tooth image. Then, the target chroma aimTS is expressed as a relative value of the average chroma aveFS of the skin region by:

$$\mathrm{aim}TS = af \times \mathrm{ave}ES \tag{22}$$

where af is a coefficient (0<af<1).

The coefficient af represents a level to whiten the tooth image relative to the skin region, and the whiteness of the tooth image becomes close to that of the skin region as the coefficient af is closer to 1. However, when the coefficient af suited to a pale face image is applied to a dark face image, the tooth image tends to be excessively white. Hence, the following equation is defined to set a larger coefficient af for the dark face image compared to the pale face image.

$$af = bf \times \mathrm{ave}FS + cf \tag{23}$$

where bf and cf are empirically defined constants.

From equations (22) and (23), the target chroma aimTS of the tooth image is expressed by:

$$\mathrm{aim}TS = (bf \times \mathrm{ave}ES + cf) \times \mathrm{ave}FS \tag{24}$$

The correction parameter P is defined based on the target chroma aimTS and average chroma aveTS of the tooth image by:

$$P = \mathrm{aim}TS/\mathrm{ave}TS \tag{25}$$

Therefore, upon combining equations (24) and (25), the correction parameter P is given by:

$$P = (bf \times \mathrm{ave}FS + cc) \times \mathrm{ave}FS/\mathrm{ave}TS \tag{26}$$

In the description of the above example, when the white eye image cannot be detected, the skin region is detected to determine the correction parameter P. Alternatively, the skin region may be detected without detecting any white eye image.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-346651, filed Dec. 22, 2006, which is hereby incorporated by reference herein in its entirety.

What is claimed is:

1. An image processing apparatus comprising:
an input section, arranged to input image data from a digital camera or a memory card;
a first detector, arranged to detect an image region corresponding to teeth from the image data;
a second detector, arranged to detect a white eye portion from the image data;
a determiner, arranged to determine whether or not the white eye portion is detected;
a third detector, arranged to detect, if the white eye portion is not detected, a skin region in a face from the image data;
a first calculator, arranged to calculate, if the white eye portion is detected, a first correction amount for a color of the image region based on a feature amount of a color of the white eye portion;
a second calculator, arranged to calculate, if the white eye portion is not detected, a second correction amount for the color of the image region based on a feature amount of a color of the skin region;
a corrector, arranged to correct the color of the image region of the image data based on the calculated first correction amount or the calculated second correction amount; and
an output section, arranged to output the image data of which the image region is corrected to an external device.

2. The apparatus according to claim 1, wherein the corrector corrects a chroma value of the image region.

3. The apparatus according to claim 1, wherein the corrector corrects brightness and chroma values of the image region.

4. The apparatus according to claim 1, wherein, if the white eye portion is detected, the corrector corrects the chroma value of the image region to be close to a chroma value of the white eye image.

5. A non-transitory computer-readable medium storing a computer executable program for causing a computer to implement an image processing apparatus according to claim 1.

6. An image processing method comprising:
using a processor to perform the steps of:
detecting an image region corresponding to teeth from image data;
detecting a white eye portion from the image data;
determining whether or not the white eye portion is detected;
detecting, if the white eye portion is not detected, a skin region in a face from the image data;
calculating, if the white eye portion is detected, a first correction amount for a color of the image region based on a feature amount of a color of the white eye portion;
calculating, if the white eye portion is not detected, a second correction amount for the color of the image region based on a feature amount of a color of the skin region; and
correcting the color of the image region in the image data based on the calculated first correction amount or the calculated second correction amount.

* * * * *